US012599868B2

(12) United States Patent
Ghodasara et al.

(10) Patent No.: US 12,599,868 B2
(45) Date of Patent: Apr. 14, 2026

(54) DESULFURIZATION OF CARBON DIOXIDE-CONTAINING GASES

(71) Applicant: Air Products and Chemicals, Inc., Allentown, PA (US)

(72) Inventors: Kamlesh Ghodasara, Borehamwood (GB); Paul Higginbotham, Guildford (GB); Jeffrey R. Hufton, Fogelsville, PA (US); Shubhra Jyoti Bhadra, Macungie, PA (US); Maulik R. Shelat, Macungie, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 769 days.

(21) Appl. No.: 17/856,455

(22) Filed: Jul. 1, 2022

(65) Prior Publication Data

US 2024/0001288 A1 Jan. 4, 2024

(51) Int. Cl.
*B01D 53/14* (2006.01)
*B01D 53/00* (2006.01)
(Continued)

(52) U.S. Cl.
CPC ....... *B01D 53/1468* (2013.01); *B01D 53/002* (2013.01); *B01D 53/0476* (2013.01);
(Continued)

(58) Field of Classification Search
CPC .............. B01D 53/1468; B01D 53/002; B01D 53/0476; B01D 53/526; B01D 53/75;
(Continued)

(56) References Cited

U.S. PATENT DOCUMENTS 4,425,317 A * 1/1984 Zeller ................ B01D 53/1462
423/563
5,674,463 A * 10/1997 Dao ................... B01D 53/8606
423/244.01
(Continued)

FOREIGN PATENT DOCUMENTS

CN 101653688 A * 2/2010
CN 104555940 A * 4/2015 ............. B01D 53/75
(Continued)

*Primary Examiner* — Stephen Hobson
(74) *Attorney, Agent, or Firm* — DaLesia H. Boyd; Jason M. Ploeger

(57) ABSTRACT

Sulfur-containing compounds are removed from crude $CO_2$ by conversion to elemental sulfur in a Claus process and subsequently by hydrogenation of the Claus tail gas to convert residual sulfur-containing compounds into $H_2S$ which, after cooling to knock out water and then compressing, is removed, together with any other sulfur-containing impurities, either by physical separation or by chemical reaction with a solid metal oxide to form solid metal sulfide with subsequent oxidative regeneration to produce purified $CO_2$ and a recycle gas comprising at least one sulfur-containing compound which is recycled to the Claus process. Some $H_2S$ in the Claus tail gas may be removed initially by selective and/or non-selective amine absorption (s) in a tail gas treatment unit prior to removal of residual $H_2S$ and any other residual sulfur-containing impurities by the physical separation or the chemical reaction steps.

14 Claims, 7 Drawing Sheets

(51) Int. Cl.
    *B01D 53/047*      (2006.01)
    *B01D 53/52*      (2006.01)
    *B01D 53/75*      (2006.01)
    *B01D 53/96*      (2006.01)

(52) U.S. Cl.
    CPC ........... *B01D 53/526* (2013.01); *B01D 53/75* (2013.01); *B01D 53/96* (2013.01); *B01D 2252/204* (2013.01); *B01D 2253/1124* (2013.01); *B01D 2257/304* (2013.01); *B01D 2258/0283* (2013.01)

(58) Field of Classification Search
    CPC .............. B01D 53/96; B01D 2252/204; B01D 2253/1124; B01D 2257/304; B01D 2258/0283; B01D 2257/504; B01D 53/04; B01D 53/81; B01D 53/8612; B01D 2256/22; B01D 53/52; B01D 53/1475; B01D 53/22; C01B 17/164; C01B 32/50; C01B 17/0404; C01P 2006/80; Y02C 20/40
    See application file for complete search history.

(56)          References Cited

U.S. PATENT DOCUMENTS

| | | | | |
|---|---|---|---|---|
| 11,311,855 | B2 * | 4/2022 | Tsapatsis | ................. B01J 20/08 |
| 2010/0011955 | A1 * | 1/2010 | Hufton | ................. B01D 53/047 |
| | | | | 96/140 |

| | | | | |
|---|---|---|---|---|
| 2012/0011856 | A1 * | 1/2012 | Wright | ...................... C01B 3/56 |
| | | | | 60/780 |
| 2012/0012000 | A1 * | 1/2012 | Wright | ................. B01D 53/047 |
| | | | | 95/96 |
| 2012/0027655 | A1 * | 2/2012 | Schaffer | ................. C01B 3/501 |
| | | | | 423/220 |
| 2015/0191360 | A1 * | 7/2015 | Weiss | ................. C01B 17/0456 |
| | | | | 423/437.1 |
| 2015/0307359 | A1 * | 10/2015 | Weiss | ................. C01B 17/0447 |
| | | | | 423/437.1 |
| 2016/0108333 | A1 * | 4/2016 | Weiss | ........................ C10L 3/12 |
| | | | | 422/187 |
| 2019/0233296 | A1 * | 8/2019 | Novek | ................. B01D 61/029 |
| 2021/0086131 | A1 * | 3/2021 | Northrop | ........... B01D 53/1431 |
| 2025/0144601 | A1 * | 5/2025 | Golden | ............... B01D 53/047 |

FOREIGN PATENT DOCUMENTS

| | | | | | |
|---|---|---|---|---|---|
| CN | 108128757 | A | * | 6/2018 | ......... C01B 17/0478 |
| CN | 109381985 | A | * | 2/2019 | ............. B01D 53/96 |
| CN | 109550365 | A | * | 4/2019 | ............. B01D 53/18 |
| CN | 109592647 | A | * | 4/2019 | ......... C01B 17/0473 |
| CN | 116218575 | B | * | 4/2025 | ............. B01D 53/52 |
| EP | 798032 | A1 | | 1/1997 | |
| GB | 871750 | A | | 6/1961 | |
| WO | 2016075109 | A | | 5/2016 | |
| WO | WO-2019025905 | A1 | * | 2/2019 | ............. C10L 3/101 |
| WO | 2021130530 | A1 | | 1/2021 | |

* cited by examiner

DESULFURIZATION OF CARBON DIOXIDE-CONTAINING GASES

BACKGROUND OF THE INVENTION

The present invention is in the field of carbon dioxide ($CO_2$) recovery and purification. In particular, the invention relates to methods and apparatus for desulfurization of $CO_2$-containing streams for carbon capture and storage ("CCS").

There are many examples in the art of methods for removing sulfur-based compounds such as hydrogen sulfide ($H_2S$), carbonyl sulfide (COS), mercaptans (i.e., thiols), carbon disulfide ($CS_2$) and/or sulfur oxides ($SO_x$), from crude $CO_2$ or other $CO_2$-containing gases.

GB871750 is concerned with methods in which $H_2S$ is removed from $CO_2$-containing gases generated either by combustion of hydrocarbons or in blast furnaces. Such gases usually contain up to 400 ppm $H_2S$. Since the $CO_2$ is intended primarily for use in the synthesis of urea, the amount of $H_2S$ must be reduced to no more than 2 ppm. The reference teaches that the amount of $H_2S$ in the $CO_2$ gas is reduced to the necessary levels by passing the gas through a layer of zeolite that has been activated by heating to remove water of crystallization. Activation of the zeolite by driving off this water creates interstitial voids having dimensions that enable adsorption of $H_2S$. The gas feed to the zeolite can be dried or undried and the zeolite may be regenerated thermally using a heated regeneration gas.

U.S. Pat. No. 5,674,463A is concerned with methods for purifying $CO_2$ obtained from natural sources, such as natural gas, or produced in industry, particularly by the combustion of hydrocarbon products, for use in applications requiring high purity $CO_2$ such as the manufacture of foodstuffs or medical products. The reference teaches that COS and $H_2S$ are removed from $CO_2$ gas by first contacting the $CO_2$ with water vapor in the presence of a hydrolysis catalyst such as activated alumina to convert COS in the gas to $H_2S$, and then converting $H_2S$ in the resultant gas using an oxidation catalyst such as iron oxide to form elemental sulfur and metal sulfides which are then removed from the gas. Any residual sulfur compounds may be removed by contacting the remaining gas with copper oxide, zinc oxide or mixed copper-zinc oxides.

US2012/0012000A is concerned primarily with separating a sour (i.e., sulfur-containing) syngas comprising hydrogen ($H_2$) and carbon monoxide (CO), together with $H_2S$ and $CO_2$, obtained from gasification of a solid or liquid carbonaceous feedstock into at least a $CO_2$ product stream suitable for geological storage, a syngas ($H_2/CO$) product stream suitable for use in a chemical plant or refinery or as a fuel for a gas turbine, and a $H_2S$-enriched stream which can be further processed in, for example, a Claus plant or other suitable sulfur recovery system. The reference teaches introducing the sour synthesis gas into pressure swing adsorption (PSA) system which separates the feed gas into the syngas product stream and a stream enriched in $CO_2$ and $H_2S$, or separates a $H_2S$-depleted feed gas (produced in sour-PSA system) into the syngas product stream and a $CO_2$-enriched gas stream. The sour-PSA system contains an $H_2S$-selective adsorbent such silica gel, activated carbon or molecular sieve.

WO2016/075109A discloses a process for removing $H_2S$ equivalents such as COS and/or $CS_2$ by adsorption from Claus tail gas comprising $CO_2$. The tail gas comprising $H_2S$ equivalents and $CO_2$ is fed to an adsorption system where it is contacted with an alumina-based adsorbent material to produce a first product gas that is $CO_2$-rich. The adsorbent material is regenerated with a purge gas containing steam to recover the adsorbed impurities in the form of $H_2S$ and obtain a second product gas comprising $H_2S$ which is recycled to the Claus unit. Optionally, the purged adsorbent material is then dried.

However, there remains a need for a new methods and apparatus for the desulfurization of $CO_2$-containing streams, particularly where the $CO_2$ is intended for CCS in view of the low maximum limit (e.g. no more than 100 ppm in total) for sulfur-containing compounds.

BRIEF SUMMARY OF THE INVENTION

The present invention concerns a method for desulfurization of $CO_2$-containing gas streams. Such streams are often by-products of crude oil refining or other industrial processes involving physical and chemical gas treatment units used in refineries, natural gas processing plants and gasification or synthesis gas plants, and may be referred to as "acid" gas streams. These "acid" gases will comprise $H_2S$ as an impurity, often (but not always) together with one or more of $CS_2$, COS and mercaptans.

Such gases are typically treated in a Claus process which recovers elemental sulfur from gaseous $H_2S$ in the presence of $O_2$ according to the following overall reactions:

$$2H_2S + 3O_2 \rightarrow 2SO_2 + 2H_2O$$

$$4H_2S + 2SO_2 \rightarrow 3S_2 + 4H_2O$$

The Claus process may involve either a thermal process or a catalytic process but usually involves a combination of both thermal and catalytic processes to boost overall yields of sulfur. In the thermal process, gaseous $H_2S$ reacts in a sub-stoichiometric combustion at temperatures above 850° C. to produce elemental sulfur and water. In the catalytic process, gaseous $H_2S$ reacts with $SO_2$ over a catalyst such as activated aluminum (Ill) or titanium (IV) oxide to produce further elemental sulfur and water.

Most commercial Claus processes will involve a thermal stage followed by one or more catalytic stages, with sulfur removed between stages by condenser(s). The first stage usually operates at about 315° C. to about 330° C. to help hydrolyze COS and $CS_2$. Subsequent stages typically operate at lower temperatures to increase catalytic conversion although above the dew point of sulfur. Thus, a second stage may operate at about 240° C., while a third stage may operate at about 200° C. The $O_2$ may be provided to the Claus process in the form of air, i.e., an "air-Claus" process, or in the form of pure $O_2$ or $O_2$-enriched air, i.e., an "oxy-Claus" process.

The inventors have realized that any sulfur-containing compounds that are not $H_2S$ such as COS, $CS_2$ and mercaptans from the original "acid" gas, together with $SO_2$ from the Claus process, may be removed from the tail gas by hydrogenation to form $H_2S$ which may then then removed together with the residual $H_2S$ from the Claus process, either by physical separation or by chemical reaction with at least one solid metal oxide to form metal sulfide(s) and subsequent oxidative regeneration to produce purified $CO_2$ and a recycle gas comprising at least one sulfur-containing compound which is recycled to the Claus process.

Physical separation of $H_2S$ and any other sulfur-containing compounds from $CO_2$ may be achieved either by:

(i) selective adsorption of the sulfur-containing compounds on an adsorbent material that is selective for such compounds—adsorption is purely physical in the sense that the compounds in question are not converted by chemical reaction with the adsorption material such that, when the adsorbent is regenerated to remove the adsorbed compounds, the spent regeneration gas contains the impurities from the impure gas feed to the adsorbent; or (ii) distillation and/or partial condensation with phase separation.

The $H_2S$ and any other sulfur-containing compounds may alternatively be removed from impure $CO_2$ gas by reaction with a bed comprising at least one solid metal oxide, e.g., zinc oxide (ZnO), to convert the metal oxide(s) into metal sulfide(s), e.g., zinc sulfide (ZnS). The metal oxide(s) may be regenerated by oxidation using a regeneration gas comprising $O_2$ to drive the sulfur from the bed as sulfur dioxide ($SO_2$).

Thus, according to a first aspect of the present invention, there is provided a method for desulfurization of crude carbon dioxide ($CO_2$) gas comprising hydrogen sulfide ($H_2S$) and optionally at least one other sulfur-containing impurity, said method comprising:

feeding crude $CO_2$ gas comprising $H_2S$ to a Claus process to convert $H_2S$ in the presence of oxygen ($O_2$) gas to elemental sulfur and produce Claus tail-gas comprising $CO_2$, residual $H_2S$ and at least one other sulfur-containing impurity;

feeding said Claus tail-gas to a hydrogenation process to convert said at least one other sulfur-containing impurity into $H_2S$ in the presence of hydrogen ($H_2$) and produce $H_2S$-enriched $CO_2$ tail-gas;

cooling said $H_2S$-enriched $CO_2$ tail gas and removing condensed water to produce cooled $H_2S$-enriched $CO_2$ tail gas;

compressing said cooled $H_2S$-enriched $CO_2$ tail-gas, or an impure $CO_2$ gas comprising $H_2S$ derived therefrom, to produce compressed impure $CO_2$ gas comprising $H_2S$;

removing $H_2S$ and any other sulfur-containing impurities from said compressed impure $CO_2$ gas by physical separation and/or by chemical reaction with at least one solid metal oxide to form solid metal sulfide(s) and subsequent oxidative regeneration, to produce purified $CO_2$ and a first recycle gas comprising at least one sulfur-containing compound; and recycling said first recycle gas to said Claus process to convert said at least one sulfur-containing compound into elemental sulfur.

According to a second aspect of the present invention, there is provided apparatus for desulfurizing crude $CO_2$ gas comprising $H_2S$ and optionally at least one other sulfur-containing impurity, said apparatus comprising:

a Claus unit for removing $H_2S$ from crude $CO_2$ gas, said Claus unit comprising:

a first inlet for oxidant gas comprising $O_2$;

a second inlet for said crude $CO_2$ gas;

a first outlet for Claus tail-gas comprising $CO_2$, residual $H_2S$ and at least one other sulfur-containing impurity; and a second outlet for elemental sulfur;

a source of oxidant gas comprising $O_2$ in fluid flow communication with the first inlet of the Claus unit;

a source of crude $CO_2$ gas in fluid flow communication with the second inlet of the Claus unit;

a hydrogenation unit for converting said at least one other sulfur-containing impurity in said Claus tail-gas into $H_2S$, said hydrogenation unit comprising:

a first inlet in fluid flow communication with the first outlet of said Claus unit;

a second inlet for $H_2$; and a first outlet for $H_2S$-enriched $CO_2$ tail-gas;

a source of $H_2$ in fluid flow communication with the second inlet of said hydrogenation unit;

a cooling unit for cooling $H_2S$-enriched $CO_2$ tail gas, said cooling unit comprising:

a first inlet in fluid communication with said first outlet of said hydrogenation unit;

a first outlet for cooled $H_2S$-enriched $CO_2$ tail gas; and a second outlet for condensed water;

a compression unit for compressing cooled $H_2S$-enriched $CO_2$ tail-gas or impure $CO_2$ gas comprising $H_2S$ derived therefrom, said compression device comprising:

an inlet in fluid flow communication with the first outlet of said cooling unit; and an outlet for compressed impure $CO_2$ gas;

and a purification unit for removing $H_2S$ and any other sulfur-containing impurities from compressed impure $CO_2$ gas by physical separation or by chemical reaction with at least one metal oxide to form solid metal sulfide(s) and subsequent oxidative regeneration, said purification unit comprising:

a first inlet in fluid flow communication with the outlet of said compression unit;

a first outlet for purified $CO_2$; and a second outlet for a first recycle gas comprising at least one sulfur-containing compound, wherein the second outlet of said purification unit is in fluid communication with said Claus unit.

The term "crude $CO_2$" refers to a gas mixture comprising at least about 50 mol. % $CO_2$, e.g., from about 50 mol. % to about 80 mol. % $CO_2$. The crude $CO_2$ is a gaseous mixture comprising $H_2S$ and typically water but, in some embodiments, other components, e.g., one or more other sulfur-containing compounds, may be present.

The term "sulfur-containing compound" refers to a compound containing at least one sulfur atom. Examples of sulfur-containing compounds include $H_2S$, COS, $CS_2$, $SO_2$ and mercaptans (or thiols). $H_2S$ will normally be present in the crude $CO_2$ feed and is also produced in the hydrogenation step of the present invention. COS and/or $CS_2$ may be present in the crude $CO_2$ feed but may also be produced in the Claus process. $SO_2$ will not typically be present in the crude $CO_2$ feed but is produced in the Claus process. Mercaptans are not produced in the process of the present invention so, if present in the $CO_2$, would come in with the crude $CO_2$ feed gas.

The term "sulfur-containing impurity" refers to an individual sulfur-containing compound present in a gas at an impurity level, e.g., no more than 5 mol. % (or 50000 ppm), and usually no more than 3 mol. % (or 30000 ppm).

The term "impure $CO_2$" refers to a $CO_2$-containing gas having a higher proportion (in terms of mole fraction) of $CO_2$ than the crude $CO_2$ from which it is derived. Such gases typically comprise at least about 80 mol. % $CO_2$, e.g., from 80 mol. % to about 95 mol. % $CO_2$.

The term "physical separation" refers to a process in which at least one sulfur-containing component of a fluid mixture is removed from the other component(s) of the mixture without chemical change, reaction or conversion. In other words, the component(s) is/are separated from the mixture "as is", i.e., in the form that they are present in the fluid mixture.

The term "oxidative regeneration" refers to a process in which solid metal oxide(s) are regenerated from solid metal sulfide(s) by oxidation, typically using a regeneration gas comprising $O_2$.

The term "purified $CO_2$" refers to a $CO_2$-containing gas that has a higher proportion (in terms of mole fraction) of $CO_2$ than the impure $CO_2$ from which it is derived. Such gases typically comprise at least about 95 mol. % $CO_2$, e.g., from about 95 mol. % to 100 mol. % $CO_2$, and typically no more than 500 ppm, and possibly no more than 100 ppm in total of the sulfur-containing compound(s).

The term "further purified $CO_2$" refers to a $CO_2$-containing gas that has a higher proportion (in terms of mole fraction) of $CO_2$ than the purified $CO_2$ from which it is derived. Such gases typically comprise at least about 99 mol. % $CO_2$, e.g., from about 99 mol. % to 100 mol. % $CO_2$, and typically no more than 100 ppm in total of the sulfur-containing compound(s).

An "$H_2S$-enriched" gas is a gas that contains a higher proportion (in terms of mole fraction) of $H_2S$ than the $H_2S$-containing gas from which it is derived.

An "$H_2S$-depleted" gas is a gas that contains a lower proportion (in terms of mole fraction) of $H_2S$ than the $H_2S$-containing gas from which it is derived. The term embraces (although is not limited to) gases that contain no $H_2S$.

A "sulfur-selective adsorbent material" is a material that adsorbs sulfur-containing compounds in preference to at least one other component in a gas mixture, i.e., has a higher affinity for sulfur-containing compounds than for the other component(s) of the gas mixture.

"Selective adsorption" is a process in which the sulfur-containing component(s) being removed from the impure $CO_2$ are adsorbed selectively on to an adsorbent and subsequently recovered (in the same chemical form) by desorption using a regeneration gas.

A "water-selective adsorbent material" is a material that adsorbs water in preference to at least one other component in a gas mixture, i.e., has a higher affinity for water than the other component(s).

A "bed" contains particles of either selectively adsorbent material or solid metal oxide(s), or both types of particles. The bed of particles is typically a packed bed but may be a fluidized bed. In a packed bed comprising both types of particles, the particles are typically in separate layers.

The term "downstream" in the context of a selective adsorption unit or reactor refers to a relative location when the unit or reactor is on-feed. The term "upstream" should be interpreted accordingly.

The term "selective amine absorption" refer to a separation or purification process using an amine that selectively (although not necessarily exclusively) absorbs a particular acid gas component, e.g., $H_2S$, in a gas mixture, e.g., $H_2S$-enriched $CO_2$ tail gas.

The term "non-selective amine absorption" refers to a separation or purification process using an amine that absorbs a particular acid gas component, e.g., $H_2S$, in a gas mixture, e.g., $H_2S$-depleted $CO_2$ tail gas, possibly in combination with another acid gas component, e.g., $CO_2$.

The term "non-condensable gas" refers to a gas that is not condensable under the conditions of the present invention. Examples of non-condensable gases include $H_2$, $N_2$ and $O_2$ and noble gases.

A "$CO_2$ purification unit" (i.e., a "CPU") is a unit which purifies (or further purifies) $CO_2$ by partial condensation with phase separation. Such a unit typically comprises a heat exchanger to cool and partially condense the gas to be purified and one or more, e.g., two, phase separators in series to separate a condensed phase from a vapour phase.

A "distillation unit" is a unit which purifies (or further purifies) $CO_2$ by distillation. Such a unit typically comprises a heat exchanger to cool and optionally at least partially condense the gas to be purified and at least one distillation column. The column may contain trays or may be packed with loose and/or structured packing to increase the vapour/liquid contact surface area within the column.

BRIEF DESCRIPTION OF THE DRAWINGS

Preferred embodiments of the present invention will now be described with reference to the drawings in which.

DETAILED DESCRIPTION OF THE INVENTION

Figure 1:
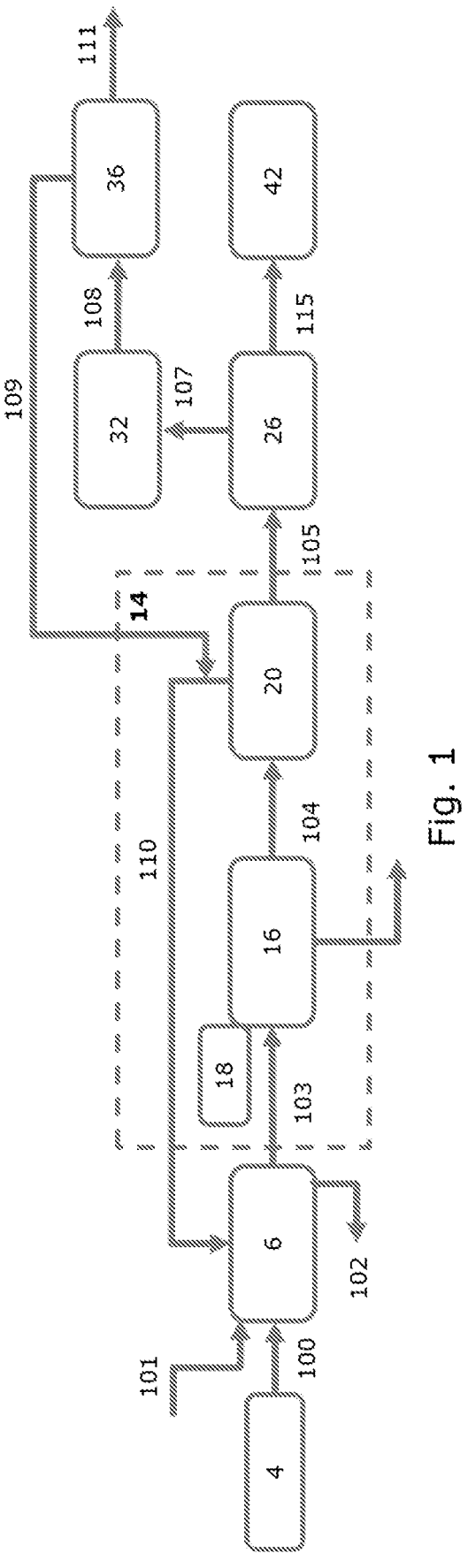
FIG. 1 is a simplified flowsheet depicting an embodiment of the invention in which tail gas from a Claus plant is treated by hydrogenation and selective amine absorption (to remove $H_2S$) in a tail gas treatment unit before $CO_2$ is recovered by non-selective amine absorption and purified in a selective adsorption unit (or a reactor)

The first aspect of the present invention is a method for desulfurization of crude $CO_2$ gas comprising $H_2S$ and optionally at least one other sulfur-containing impurity. The method comprises feeding crude $CO_2$ gas comprising $H_2S$ to a Claus process to convert $H_2S$ in the presence of $O_2$ gas into elemental sulfur and produce Claus tail-gas comprising $CO_2$, residual $H_2S$ and at least one sulfur-containing impurity. The Claus tail-gas is fed to a hydrogenation process to convert the other sulfur-containing impurity (or impurities) into $H_2S$ in the presence of $H_2$ and produce $H_2S$-enriched $CO_2$ tail-gas. The $H_2S$-enriched $CO_2$ tail-gas is cooled to knock-out water and the resultant cooled $H_2S$-enriched tail gas (or an impure $CO_2$ gas comprising $H_2S$ derived therefrom) is compressed to produce compressed impure $CO_2$ gas comprising $H_2S$. $H_2S$ and any other sulfur-containing impurities are removed from the compressed gas by physical separation or by chemical reaction with solid metal oxide(s) to form solid metal sulfide(s) which are converted back to the metal oxide(s) by oxidative regeneration to produce purified $CO_2$ and a first recycle gas comprising at least one sulfur-containing compound. The first recycle gas is recycled to said Claus process to convert the at least one sulfur-containing compound into elemental sulfur.

Embodiments of the present invention improve the recovery and/or purity of $CO_2$ from crude $CO_2$ comprising $H_2S$ and optionally any other sulfur-containing impurities.

The Claus process may be a conventional "air-Claus" process or an "oxy-Claus" process as described above but in either case typically comprises a thermal stage and at least one, e.g., from one to four, preferably two or three, catalytic stages. Recycle gas(es) may be recycled either to the feed to the Claus process or to an interstage location, i.e., between two stages within the process, or both.

The Claus process may alternatively be a SUPER-CLAUS© process or a EUROCLAUS® process, or a combination of the two Claus processes.

The SUPERCLAUS® process consists of a thermal stage followed by a minimum three catalytic reaction stages, with sulfur removed between stages by condensers. The first reactors are filled with standard Claus catalyst such as activated alumina, promoted alumina and/or titania ($TiO_2$), while the final reactor is filled with a selective oxidation catalyst such as iron oxide and/or chromium oxide (or other metal oxides) on alpha alumina or silica. In the thermal stage, the acid gas is burned with a sub-stoichiometric amount of controlled combustion air (or pure $O_2$ or $O_2$-enriched air), such that the tail gas leaving the last Claus reactor contains typically 0.8 to 1.0 vol. % $H_2S$. The selective oxidation catalyst in the final reactor oxidizes the $H_2S$ to sulfur at an efficiency of more than 85%. A third Claus reactor stage could be installed upstream of the selective oxidation reactor if a sulfur recovery rate of more than 99% is required.

The EUROCLAUS® process consists of a thermal stage followed by three or four catalytic reaction stages, with sulfur removed between stages by condensers. The final Claus reactor is filled with a layer of hydrogenation catalyst such as CoMo catalyst (cobalt & molybdenum oxides on alumina), followed by a reactor filled with selective oxidation catalyst such as iron oxide and/or chromium oxide (or other metal oxides) on alpha alumina or silica. In the thermal stage, the acid gas is burned with a sub-stoichiometric amount of controlled combustion air, and the tail gas leaving the last Claus reaction typically contains 0.8 to 1.0 vol. % $H_2S$ and 100 to 200 ppmv $SO_2$. This low $SO_2$ content is obtained with a hydrogenation catalyst that converts $SO_2$ to $H_2S$ in the last Claus reactor. The selective oxidation catalyst in the final reactor oxidizes the $H_2S$ to sulfur at an efficiency of more than 85%. Total sulfur recovery efficiency up to 99.3% can be obtained with three reactor stages, and up to 99.5% can be achieved with four stages.

The crude $CO_2$ gas may be fed to the Claus process at a temperature from about 10° C. to about 70° C., e.g., about 45° C., and at a pressure in a range from about 0.3 bar gauge (g) to about 30 bar g, e.g., from about 0.3 bar g to about 1.8 bar g, e.g., about 0.9 bar g.

The hydrogenation process requires $H_2$ as the reducing gas. The $H_2$ may generated in a $H_2$ generation process such as the partial oxidation of natural gas with sub-stoichiometric air/oxygen in a reducing gas generator, and then fed to the hydrogenation process. However, the demand for fresh $H_2$, or "make-up" $H_2$, from the $H_2$ generation process may be reduced or even eliminated entirely by recycling $H_2$ from another point in the process (see below).

The Claus tail-gas may be fed to the hydrogenation process at a temperature in a range from about 120° C. to about 200° C., e.g., about 130° C., and at a pressure in a range from about 0.2 bar g to about 30 bar g, e.g., from about 0.2 bar g to about 1.8 bar g, e.g., about 0.3 bar g. The pressure and/or temperature of the Claus tail gas may be adjusted as required using conventional means prior to being fed to the hydrogenation process although, in preferred embodiments, the tail gas is fed to the hydrogenation process without adjustment in this way.

The $H_2S$-enriched $CO_2$ tail gas from the hydrogenation process is cooled. Any suitable cooling process may be used but, in preferred embodiments, the $H_2S$-enriched $CO_2$ tail gas is quenched by direct contact with liquid water. After removal of condensed water, the cooled $H_2S$-enriched $CO_2$ tail gas is compressed to form compressed impure $CO_2$ gas comprising $H_2S$.

The cooled $H_2S$-enriched $CO_2$ tail gas may be fed to a compression unit at a temperature in a range from about 10° C. to about 70° C., e.g., about 45° C., and at a pressure in a range from about 0.3 bar g to about 1.8 bar g, e.g., about 1 bar g. The compression unit compresses the gas to a pressure in a range from about 1 bar g to about 120 bar g, e.g., about 30 bar g.

The content of $H_2S$ and any other sulfur-containing impurities in the compressed impure $CO_2$ gas is reduced significantly, in some embodiments to a level below 100 ppm, either by physical separation or by chemical reaction with at least one solid metal oxide to form solid metal sulfide(s) and subsequent oxidative regeneration to produce purified $CO_2$, together with a first recycle gas comprising at least one sulfur-containing compound which is recycled to the Claus process.

Physical separation may be by selective adsorption or by distillation and/or partial condensation with phase separation.

In embodiments using selective adsorption, the method involves removing $H_2S$ and any other sulfur-containing compounds in the compressed impure $CO_2$ gas by adsorption on a bed of at least one adsorbent material selective for sulfur-compounds in a selective adsorption unit to produce the purified $CO_2$ and, after desorption, a spent regeneration gas comprising $H_2S$ and any other sulfur-containing compounds from the compressed impure $CO_2$ gas as the first recycle gas.

Such adsorbent materials include silica gel, molecular sieves (e.g., 4A or 5A zeolites), activated alumina and activated carbons (e.g., Calgon Cu material and Cu-impregnated carbons). The sulfur-containing compounds are adsorbed reversibly on a bed of the solid selective adsorbent(s) and then desorbed, preferably once the solid adsorbent is saturated with the sulfur-containing compound(s). The adsorption process may operate any suitable cycle including PSA, vacuum swing adsorption (VSA) or temperature swing adsorption (TSA). Specific examples include TSA with silica gel; PSA or VSA with silica gel; TSA with zeolites (e.g., 4A, 5A); and TSA with Cu-impregnated carbons.

Compressed impure $CO_2$ gas may be fed to a selective adsorption unit at a temperature in a range from about 10° C. to about 70° C., e.g., about 50° C.

The adsorbent bed of the selective adsorption unit is suitably regenerated using purified (or further purified) $CO_2$ generated in the process. The temperature and/or pressure of the regeneration gas may be adjusted as required using conventional means depending on the temperature and/or pressure of the $CO_2$ gas at the location at which it is removed from the process and the type of cycle being used, e.g., TSA, VSA or PSA, etc. In embodiments using solid metal oxide(s) to purify the compressed impure $CO_2$ gas, the method comprises passing the compressed gas through a bed comprising at least one solid metal oxide in a reactor. The $H_2S$ and any other sulfur-containing impurities in the gas convert the metal oxide(s) in the bed to the corresponding metal sulfide(s), thereby removing the impurities from the gas and producing the purified $CO_2$. The metal oxide(s) in the bed is/are regenerated oxidatively by passing a regeneration gas comprising $O_2$ through the bed, usually in a direction countercurrent to the gas when the bed is "on feed", which drives off the sulfur from the bed in the form of $SO_2$. The spent regeneration gas comprising $SO_2$ is then recycled to the Claus process as the first recycle gas.

In embodiments in which $H_2S$ is removed by chemical reaction with at least one solid metal oxide, suitable solid metal oxides include zinc (II) oxide (ZnO), iron (Ill) oxide ($Fe_2O_3$), aluminum (Ill) oxide ($Al_2O_3$) and Group II metal oxides such as calcium oxide (CaO), magnesium oxide (MgO) and barium oxide (BaO). A single metal oxide may be used but, in some embodiments, a mixture of metal oxides (i.e., a mixed metal oxide) is used. In some embodiments, the mixture of solid metal oxides comprises from about 40 wt % to about 60 wt %, e.g., about 50 wt %, of ZnO.

An example of a suitable mixed metal oxide is disclosed in U.S. Pat. No. 4,044,114 and comprises from about 20 wt % to about 85 wt %, preferably from about 25 wt % to about 80 wt %, of zinc oxide (calculated as ZnO), from about 0.9 wt % to about 50 wt % of alumina (calculated as $Al_2O_3$), and from about 2 wt % to about 45 wt % of an oxide of a Group II metal, preferably calcium (calculated as oxide) with or without additional elements.

Compressed impure $CO_2$ gas may be fed to the reactor at a temperature in a range from about 300° C. to about 800° C., or from about 300° C. to about 700° C., e.g., from about 400 to about 550° C.

After compression, the temperature of the compressed gas may be adjusted as required using conventional means prior to being fed to the reactor containing the solid metal oxide(s).

The mixed metal oxide bed of the reactor is suitably regenerated using an oxygen-containing gas, such as purified (or further purified) $CO_2$ generated in the process to which $O_2$ is added in an amount in a range from about 1 to about 5 mol. %, e.g., about 2 mol. %, oxygen. The temperature and/or pressure of the regeneration gas may be adjusted as required using conventional means depending on the temperature and/or pressure of the $CO_2$ gas at the location at which it is removed from the process.

The first recycle gas may be recycled to the Claus process at a temperature in a range from about 10° C. to about 70° C., e.g., about 50° C. and at a pressure in a range from about 0.3 bar g to 30 bar g, or from about 0.3 bar g to about 1.8 bar g, e.g., about 1 bar g. In embodiments in which the temperature and/or pressure of the first recycle gas leaving the purification process is not appropriate in view of the operating conditions of the Claus unit, then the temperature and/or the pressure of the first recycle gas will be adjusted by conventional means as appropriate.

The compressed impure $CO_2$ gas being fed to the selective adsorption unit or to the reactor containing the solid metal oxide(s) will typically contain water. In such cases, the water may be removed by adsorption on at least one adsorbent material selective for water located downstream of either the adsorbent material(s) selective for sulfur-containing compounds or the solid metal oxides. Suitable water selective adsorbent materials include those materials identified above as sulfur-selective adsorbent materials. The water selective adsorbent material(s) may be located in the same vessel as the sulfur-selective adsorbent material(s) or metal oxides, e.g., in a separate layer, or in a separate vessel.

Alternatively, the water may be removed by absorption in a separate vessel, e.g. a glycol unit, located downstream of either the selective adsorption unit or the reactor.

Whether the sulfur-containing impurities are removed by selective adsorption or chemical reaction with solid metal oxide(s), the regeneration gas may contain a small amount of water. However, if water is present, the amount of water is not sufficient to hydrolyze any sulfur-containing compounds being driven off the bed that is being regenerated. In this regard, the regeneration gas typically comprises less than 5 mol. %, preferably less than 2 mol. %, more preferably less than 1 mol. % water. Such an amount of water would be considered in the art to be a de minimis amount.

The $H_2S$-enriched tail gas may be fed directly to a compression unit for compression to produce the compressed impure $CO_2$. However, in some embodiments, the method comprises recovering $H_2S$ from the $H_2S$-enriched $CO_2$ tail-gas by selective amine absorption to produce $H_2S$-depleted $CO_2$ tail-gas and recovered $H_2S$; and recycling the recovered $H_2S$ to the Claus process to convert the recovered $H_2S$ to elemental sulfur.

The $H_2S$-enriched $CO_2$ tail-gas may be fed to a selective amine absorption unit at a temperature from about 10° C. to about 70° C., e.g., about 50° C. and at a pressure from about 0.05 bar g to about 30 bar g, e.g., from about 0.05 bar g to about 1.8 bar g, e.g., about 0.1 bar g.

Conventional selective amine absorption processes using, for example, methyldiethanolamine (MDEA) as the selective amine, are suitable for use in these embodiments of the present invention.

The $H_2S$-depleted $CO_2$ tail gas may be fed directly to a compression unit for compression to produce the compressed impure $CO_2$. However, in some embodiments, the method comprises recovering $CO_2$ and residual $H_2S$ from the $H_2S$-depleted $CO_2$ tail-gas by non-selective amine absorption to produce the impure $CO_2$ gas comprising $H_2S$, together with waste gas comprising $CO_2$ and at least one non-condensable gas.

The $H_2S$-depleted $CO_2$ tail gas may be fed to a non-selective amine absorption unit at a temperature from about 10° C. to about 70° C., e.g., about 50° C. and at a pressure from about 0.01 bar g to about 30 bar g, e.g., from about 0.01 bar g to about 1.8 bar g, e.g., about 0.1 bar g.

Conventional non-selective amine absorption processes using, for example, monoethanolamine (MEA), activated methyldiethanolamine (aMDEA) or diethanolamine (DEA) as the non-selective amine, are suitable for use in these embodiments of the present invention.

Depending on the composition, any waste gas produced in the present invention may be vented or fed to a thermal oxidizer where it is combusted to produce a flue gas conforming to local emissions standards, and optionally steam. If the waste gas contains a significant amount of $H_2$, then the waste gas itself may be used as a fuel or $H_2$ may be recovered from the waste gas.

As indicated above, the purified $CO_2$ may contain less than 100 ppm of sulfur-containing impurities in which case further purification is typically not required for CCS. However, in embodiments in which the amount of the impurities exceeds this threshold, further purification is typically required.

In embodiments where further purification is required, the method may comprise feeding the purified $CO_2$ to a further purification process to produce further purified $CO_2$ and a second recycle gas comprising $CO_2$ and $H_2$; and recycling the second recycle gas, or a $H_2$-enriched gas derived therefrom, to the hydrogenation process. A portion of the second recycle gas, or of said $H_2$-enriched gas derived therefrom, is typically purged to prevent a build-up of $H_2$ (if it is in excess), or $N_2$ and/or Ar non-condensable contaminants gas within the process.

The further purification process for further purifying $CO_2$ may involve distillation such as the process disclosed in U.S. Pat. No. 10,254,042 and/or partial condensation with phase separation such as the process disclosed in U.S. Pat. No. 7,819,951, both of which the inventors have realized may be adapted as appropriate for integration with the present invention.

Both distillation and partial condensation of $CO_2$ require a temperature in a range from the critical temperature of $CO_2$ (i.e., about +31° C.) to the triple point temperature of $CO_2$ (i.e., about −57° C.).

In some embodiments, the distillation and/or partial condensation with phase separation take(s) place at a "low" (or sub-ambient) temperatures, typically in the range from about +15° C. to about −55° C. In other embodiments, the distillation and/or partial condensation with phase separation take(s) place at a temperature in the range from about 0° C. to −30° C., particularly for $H_2S$ distillation from $CO_2$.

The purified $CO_2$ is typically at a temperature from about 10° C. to about 70° C., e.g., about 50° C. and at a pressure from about 10 bar g to about 120 bar g, e.g., about 30 bar g. Thus, in embodiments in which further purification is required, the purified $CO_2$ is typically cooled, e.g., by heat exchange with a refrigerant, to a suitable temperature as described above before being further purified. Additionally or alternatively, the purified $CO_2$ would be further compressed if the pressure of the gas is not sufficient for the further purification.

Recycling $H_2$ to the hydrogenation process enables a reduction in the amount of additional $H_2$ that needs to be generated to meet demand in that process, thereby reducing the size of or even eliminating the hydrogenation unit required which in turn saves capital and operational costs. Where demand is only partially met by the recycled $H_2$, additional $H_2$ can be produced in a $H_2$ generation process as discussed above. However, in some embodiments, the amount of $H_2$ recycled to the hydrogenation process is sufficient to meet the demand for $H_2$ in that process, eliminating the need for a $H_2$ generation process entirely.

Recycling $CO_2$ to the hydrogenation process enables an increase in overall $CO_2$ recovery. It may however be desirable or advantageous to reduce the amount of $CO_2$ being recycled to the hydrogenation unit in the second recycle gas, for example to reduce the size of the hydrogenation unit. In such cases, the method may comprise recovering $H_2$ gas from a recycle gas being fed to the hydrogenation process in a membrane separation process to produce a $H_2$-enriched gas which is recycled to the hydrogenation unit, together with a waste gas comprising $CO_2$ and at least one non-condensable gas.

Conventional membrane separation units may be used to recover $H_2$ gas from recycle gas being recycled to the hydrogenation process. The membranes may be spiral wound, hollow fiber membranes made from polymers such as polysulfone, polyimide or cellulose acetate. An example of a suitable membrane separation process is disclosed in US2010/126180A which the Inventors have realized may be adapted as appropriate for integration with the present invention.

In embodiments in which $H_2S$-enriched $CO_2$ tail-gas is compressed directly to produce the compressed impure $CO_2$ gas comprising $H_2S$, the method may comprise feeding the purified $CO_2$ to a further purification process as described above to produce further purified $CO_2$ and a second recycle gas comprising $CO_2$ and $H_2$; and recycling the second recycle gas, or a $H_2$-enriched gas derived therefrom, to the hydrogenation process. A portion of the second recycle gas, or of said $H_2$-enriched gas derived therefrom, is typically purged to prevent the build-up of $H_2$ (if it is in excess), or $N_2$ and/or Ar in the process.

As mentioned above, purification by physical separation may be by distillation and/or partial condensation with phase separation.

In these embodiments, the method typically comprises removing $H_2$ and any non-condensable gases from the compressed impure $CO_2$ by distillation and/or partial condensation with phase separation to produce $H_2S$-enriched $CO_2$ fluid (which may be a liquid, a gas or two-phase) and $H_2$-enriched $CO_2$ gas, recycling the $H_2$-enriched $CO_2$ gas, or a further $H_2$-enriched $CO_2$ gas derived therefrom, as a second recycle gas to the hydrogenation process; separating the $H_2S$-enriched $CO_2$ fluid by distillation and/or partial condensation with phase separation to produce the purified $CO_2$ as overhead gas and a $H_2S$-enriched bottoms liquid; and vaporizing the $H_2S$-enriched bottoms liquid to produce $H_2S$-enriched gas as the first recycle gas. A portion of the second recycle gas, or of said $H_2$-enriched gas derived therefrom, is usually purged to avoid a build-up of $H_2$ (if it is in excess), or $N_2$ and/or Ar in the process.

As mentioned above, suitable $CO_2$ purification processes in this context are disclosed in U.S. Pat. Nos. 10,254,042 and 7,819,951 which the Inventors have realized may be adapted as appropriate for integration with the present invention.

In embodiments in which the purified $CO_2$ comprises at least one residual sulfur-containing impurity, said method may comprise further purifying said purified $CO_2$ by selective adsorption or by chemical reaction with at least one solid metal oxide to form solid metal sulfide(s) and subsequent oxidative regeneration, to produce further purified $CO_2$ and a further recycle gas comprising at least one sulfur-containing compound; and recycling said further recycle gas to said Claus process to convert said sulfur-containing compound(s) into elemental sulfur.

Alternatively, in embodiments in which the purified $CO_2$ overhead gas comprises one or more residual sulfur-containing compounds as impurities, the method may comprise removing $H_2S$ and any other sulfur-containing impurities from said purified $CO_2$ overhead gas by selective adsorption or by chemical reaction with at least one solid metal oxide to form solid metal sulfide(s) and subsequent oxidative regeneration, to produce further purified $CO_2$ and a third recycle gas comprising at least one sulfur-containing compound. The third recycle gas may be recycled to the Claus process to convert the sulfur-containing compound(s) into elemental sulfur.

The second aspect of the present invention is apparatus for desulfurizing crude $CO_2$ gas comprising $H_2S$ and optionally at least one other sulfur-containing impurity, typically in accordance with the method of the first aspect.

The apparatus comprises a Claus unit for removing $H_2S$ from crude $CO_2$ gas. The Claus unit comprises a first inlet for oxidant gas comprising $O_2$, a second inlet for the crude $CO_2$ gas, a first outlet for Claus tail-gas comprising $CO_2$, residual $H_2S$ and at least one sulfur-containing impurity; and a second outlet for elemental sulfur. An example of a suitable Claus unit is described in US2010/0126180A.

The apparatus also comprises a source of oxidant gas comprising $O_2$ in fluid flow communication with the first inlet of the Claus unit. For units operating an "air-Claus" process, the source may simply be a blower with a small filter whereas, for units operating an "oxy-Claus" process, the source may be a vacuum swing adsorption (VSA) unit or an air separation unit (ASU), optionally in combination with a back-up system such as a liquid oxygen tank and vaporizer.

In addition, the apparatus comprises a source of crude $CO_2$ gas in fluid flow communication with the second inlet of the Claus unit. Such sources include natural gas "sweetening" units which use amine absorption processes/units, membrane separation systems/units and/or low temperature purification processes/units to generate acid gas streams.

The apparatus further comprises a hydrogenation unit for converting the at least one sulfur-containing impurity in the Claus tail-gas into $H_2S$. The hydrogenation unit comprises a first inlet in fluid flow communication with the first outlet of the Claus unit, a second inlet for $H_2$ and a first outlet for $H_2S$-enriched $CO_2$ tail-gas. An example of a suitable hydrogenation unit is described in US2010/0126180A.

The apparatus also comprises a source of $H_2$ in fluid flow communication with the second inlet of the hydrogenation unit. The source may be a unit generating $H_2$ as described above.

In addition, the apparatus comprises a cooling unit for cooling $H_2S$-enriched $CO_2$ tail gas which is either separate from or integrated with the hydrogenation unit. The cooling unit comprises a first inlet in fluid communication with the first outlet of the hydrogenation unit, a first outlet for cooled $H_2S$-enriched $CO_2$ tail gas, and a second outlet for condensed water. The cooling unit may be a heat exchanger using indirect heat exchange with a coolant but is usually a direct contact cooler comprising a second inlet for cooling water. The cooling unit may be a separate unit or may be integrated with the hydrogenation unit.

Further, the apparatus comprises a compression unit for compressing $H_2S$-enriched $CO_2$ tail-gas or impure $CO_2$ gas comprising $H_2S$ derived therefrom. The compression unit must therefore be inherently suitable for handling "sour" gases.

The compression unit comprises an inlet in fluid flow communication with the outlet of the first outlet of the cooling unit; and an outlet for compressed impure $CO_2$ gas. The compression unit may comprise one or more centrifugal or reciprocating compressor and/or may be a multistage compressor with associated intercooler(s) and aftercooler(s). In particular, the compression unit may be an integrally geared or inline centrifugal compressor.

Furthermore, the apparatus comprises a purification unit for removing $H_2S$ and any other sulfur-containing impurities from compressed impure $CO_2$ gas by physical separation or chemical reaction with solid metal oxide(s). The purification unit comprises a first inlet in fluid flow communication with the outlet of said compression unit, a first outlet for purified $CO_2$; and a second outlet for a first recycle gas comprising at least one sulfur-containing compound. The second outlet of the purification unit is in fluid communication with the Claus unit. In this regard, the second outlet may be in fluid flow communication with the second inlet of the Claus unit or with a third inlet on the Claus unit which is typically dedicated for recycle gas.

Throughout the specification, the term "in fluid flow communication" is used to refer to different units (or parts of units such as inlets/outlets) being connected by conduits, pipes and/or ducting as appropriate in such a manner to allow the flow of fluid, e.g., gas, between units. The term is intended to include associated flow control devices such as the necessary sensors and/or valves to ensure operational control of the apparatus. Unless stated otherwise, the term is intended to cover both direct and indirect fluid flow communication. "Direct" fluid (or gas) flow communication means that no other fluid (or gas) processing unit (not including flow control apparatus) is provided in the line between the units so connected. "Indirect" fluid (or gas) flow communication is to be interpreted accordingly, i.e., one or more other fluid (or gas) processing units are provided in the line between the units so connected.

In some embodiments, the apparatus comprises a $H_2$ generation unit comprising an outlet for $H_2$ in fluid communication with the second inlet of the hydrogenation unit.

The purification unit in some embodiments is or comprises a selective adsorption unit comprising at least one vessel having an upstream end and a downstream end, and the or each vessel comprises an adsorbent bed comprising at least one layer of adsorbent material(s) selective for sulfur-containing compounds, a first inlet for compressed impure $CO_2$ gas at the upstream end of the or each vessel, a first outlet for purified $CO_2$ at the downstream end of the or each vessel, a second inlet for regeneration gas at the downstream end of the or each vessel; and a second outlet for spent regeneration gas at the upstream end of the or each vessel. The first inlet is in fluid flow communication with the outlet of the compression unit and the second outlet is in fluid flow communication with the Claus unit. In this regard, the second outlet may be in fluid flow communication with the second inlet of the Claus unit or with a third inlet on the Claus unit which is typically dedicated for recycle gas.

In other embodiments, the purification unit comprises a reactor comprising at least one vessel having an upstream end and a downstream end. The or each vessel comprises a bed comprising at least one solid metal oxide, a first inlet for compressed impure $CO_2$ gas at the upstream end of the or each vessel, a first outlet for purified $CO_2$ at the downstream end of the or each vessel; a second inlet for regeneration gas at the downstream end of the or each vessel; and a second outlet for spent regeneration gas at the upstream end of the or each vessel. The first inlet is in fluid flow communication with the outlet of the compression device and the second outlet is in fluid flow communication with the Claus unit. In this regard, the second outlet may be in fluid flow communication with the second inlet of the Claus unit or with a third inlet on the Claus unit which is typically dedicated for recycle gas.

The Inventors have realized that an example of a suitable reactor that may be adapted for integration with these embodiments is disclosed in U.S. Pat. No. 4,797,268.

The bed in the or each vessel of the selective adsorption unit or the reactor may comprise at least one layer of adsorbent material(s) selective for water downstream of at least one layer of adsorbent material(s) selective for sulfur-containing compound(s) or the solid metal oxide(s) respectively.

Alternatively, the purification unit may comprise a separate drier unit downstream of either the selective adsorption unit of the reactor. The drier unit may be a further selective adsorption unit or an absorption unit such as a glycol unit. Either way, the drier unit typically comprises an inlet in fluid communication with the first outlet of the selective adsorption unit or the reactor as appropriate, and an outlet for dried and purified $CO_2$.

In some embodiments, the apparatus comprises a selective amine absorption unit for recovering $H_2S$ from $H_2S$-enriched $CO_2$ tail gas. The selective amine absorption unit typically comprises an inlet in fluid flow communication with the first outlet of the cooling unit, a first outlet for $H_2S$-depleted $CO_2$ tail-gas and a second outlet for recovered gas comprising $H_2S$ in fluid flow communication with the Claus unit. In this regard, the second outlet may be in fluid flow communication with the second inlet of the Claus unit or with a third inlet on the Claus unit which is typically dedicated for recycle gas. An example of a suitable selective amine absorption unit which the Inventors have realized may be adapted for use in this context is disclosed in WO93/10883A.

In some embodiments, the first outlet of the selective amine adsorption unit is in direct fluid flow communication with the inlet of the compression unit.

In other embodiments, the apparatus may further comprise a non-selective amine absorption unit for recovering $CO_2$ and residual $H_2S$ from $H_2S$-depleted $CO_2$ tail-gas. The non-selective amine absorption unit typically comprises an inlet in fluid flow communication with the first outlet of the selective amine absorption unit, a first outlet for impure $CO_2$ gas, and a second outlet for waste gas comprising $CO_2$ and at least one non-condensable gas. The apparatus usually includes a vent for the waste gas, optionally with a thermal oxidizer comprising an inlet in fluid flow communication with the second outlet of the non-selective amine absorption unit, and an outlet for vent gas in fluid communication with the atmosphere via the vent.

In embodiments of the present invention in which the content of the sulfur-containing impurities in the purified $CO_2$ gas even after passage through a selective adsorption unit or a reactor as described above is still above the required threshold, e.g., above 100 ppm, then the apparatus may further comprise a further purification unit, such as a distillation unit and/or a partial condensation with phase separation unit (or CPU), for further purifying purified $CO_2$.

In these embodiments, the further purification unit comprises an inlet for purified $CO_2$ in fluid flow communication with the first outlet of the purification unit, a first outlet for further purified $CO_2$, and a second outlet for a second recycle gas comprising $CO_2$ and $H_2$ in fluid flow communication with either the hydrogenation unit and/or the Claus unit, and a purge line in fluid flow communication with the second outlet of said further purification unit.

For these and other embodiments involving the use of a further purification unit, the second outlet of the further purification unit may be in fluid flow communication with the first or second inlet of the hydrogenation unit or with a third inlet on the hydrogenation unit which is typically dedicated for recycle gas. The second outlet of the CPU may additionally or alternatively be in fluid communication with the first or second inlet of the Claus unit or with a third inlet on the Claus unit which is typically dedicated for recycle gas. Further, the purge line may be in direct fluid communication with a vent to the atmosphere, or with a thermal oxidizer. Alternatively, fluid from the purge line could be used as a fuel or for $H_2$ recovery.

The inventors have realized that the CPU described in FIG. 1B of U.S. Pat. No. 10,254,042 may be used (after suitable adaptation as appropriate) as the further purification unit of the present invention.

These embodiments may further comprise a membrane separation unit for recovering $H_2$ gas from second recycle gas. The membrane separation unit typically comprises an inlet for second recycle gas in fluid flow communication with the second outlet of the further purification unit, a first outlet for $H_2$-enriched gas in direct fluid flow communication with the hydrogenation unit and/or the Claus unit, and a second outlet for waste gas comprising $CO_2$ and at least one non-condensable gas.

These embodiments of the apparatus usually include a vent for the waste gas, optionally with a thermal oxidizer comprising an inlet in fluid flow communication with the second outlet of the membrane separation unit, and an outlet for vent gas in fluid communication with the vent.

In addition, the second outlet of the membrane separation unit may be in fluid flow communication with the second inlet(s) of the hydrogenation unit and/or the Claus unit or with a third inlet(s) on the hydrogenation unit and/or Claus unit which is typically dedicated for recycle gas. In this regard, extra $H_2$ can be fed to the Claus unit for combustion/disposal if not required elsewhere.

In other embodiments, the first outlet of the hydrogenation unit is in direct fluid flow communication with the inlet of the compression unit.

In these embodiments, the apparatus may comprise a further purification unit for further purifying purified $CO_2$. The further purification unit typically comprises an inlet for purified $CO_2$ in fluid flow communication with the first outlet of the purification unit, a first outlet for further purified $CO_2$, and a second outlet for a second recycle gas comprising $CO_2$ and $H_2$ in fluid flow communication with the hydrogenation unit, and a purge line in fluid flow communication with the second outlet of the further purification unit. The second outlet of the further purification unit may be in fluid flow communication with an inlet of the hydrogenation unit (and/or the Claus unit), or with an inlet on the hydrogenation unit (and/or the Claus unit) which is typically dedicated for recycle gas.

These embodiments may further comprise a membrane separation unit for recovering $H_2$ gas from second recycle gas. The membrane separation unit typically comprises an inlet for second recycle gas in fluid flow communication with the second outlet of the further purification unit, a first outlet for $H_2$-enriched gas in direct fluid flow communication with the hydrogenation unit, and a second outlet for waste gas comprising $CO_2$ and at least one non-condensable gas. The $H_2$-enriched gas is typically taken from the permeate side of the membrane(s) and the waste gas is typically taken from the retentate side of the membrane(s).

These embodiments of the apparatus usually include a vent for the waste gas, optionally with a thermal oxidizer comprising an inlet in fluid flow communication with the second outlet of the membrane separation unit, and an outlet for vent gas in fluid communication with the vent.

In addition, the second outlet of the membrane separation unit may be in fluid flow communication with the second inlet(s) of the hydrogenation unit and/or the Claus unit or with a third inlet(s) on the hydrogenation unit and/or on the Claus unit which is typically dedicated for recycle gas.

In some embodiments, the apparatus comprises a non-selective amine absorption unit for recovering $CO_2$ and $H_2S$ from $H_2S$-enriched $CO_2$ tail-gas. The non-selective amine absorption unit comprises an inlet in direct fluid flow communication with the outlet of the cooling unit, a first outlet for impure $CO_2$ gas in direct fluid flow communication with the inlet of the compression unit, and a second outlet for waste gas comprising $CO_2$ and at least one non-condensable gas. These embodiments of the apparatus usually include a vent for the waste retentate gas, optionally with a thermal oxidizer comprising an inlet in fluid flow communication with the second outlet of the membrane separation unit, and an outlet for vent gas in fluid communication with the vent.

The purification unit may be a single stage unit. In these embodiments, the purification unit comprises an inlet for compressed impure $CO_2$ in fluid flow communication with the outlet of said compression unit; a first outlet for $H_2S$-enriched $CO_2$ fluid; and a second outlet for $H_2$-enriched $CO_2$ gas in fluid flow communication with an inlet of the hydrogenation unit (and/or with an inlet of the Claus unit).

In these embodiments, the apparatus may further comprise a selective adsorption unit comprising at least one vessel having an upstream end and a downstream end in which the or each vessel comprises an adsorbent bed, said adsorbent bed comprising at least one layer of adsorbent material(s) selective for sulfur-containing compound(s); a first inlet for $H_2S$-enriched $CO_2$ fluid at said upstream end of the or each vessel; a first outlet for purified $CO_2$ at said downstream end of the or each vessel; a second inlet for regeneration gas at said downstream end of the or each vessel; and a second outlet for spent regeneration gas at said upstream end of the or each vessel. The first inlet of the selective adsorption vessel is in fluid flow communication with the first outlet of the single stage purification unit and the second outlet is in fluid flow communication with the Claus unit.

Alternatively, the apparatus may comprise a reactor comprising at least one vessel having an upstream end and a downstream end in which the or each vessel comprises a bed comprising at least one solid metal oxide; a first inlet for $H_2S$-enriched $CO_2$ fluid at said upstream end of the or each vessel; a first outlet for purified $CO_2$ at said downstream end of the or each vessel; a second inlet for regeneration gas at said downstream end of the or each vessel; and a second outlet for spent regeneration gas at said upstream end of the or each vessel. The first inlet of the reactor is in fluid flow communication with the first outlet of the single stage purification unit and the second outlet is in fluid flow communication with the Claus unit.

In still further embodiments of the apparatus, the purification unit comprises a first stage, e.g., a CPU, and a second stage, e.g., a distillation unit.

The first stage comprises an inlet for compressed impure $CO_2$ in fluid flow communication with the outlet of compression unit, a first outlet for $H_2S$-enriched $CO_2$ fluid, and a second outlet for $H_2$-enriched $CO_2$ gas in fluid flow communication with an inlet of the hydrogenation unit (and/or with an inlet of the Claus unit).

The second stage comprises an inlet for $H_2S$-enriched $CO_2$ fluid in fluid flow communication with the first outlet of first stage, a first outlet for purified $CO_2$ gas, and a second outlet for $H_2S$-enriched gas in fluid flow communication with the third inlet of the Claus unit. These embodiments of the apparatus further comprise a purge line in fluid flow communication with the second outlet of the first stage of the purification unit.

Figure 2:
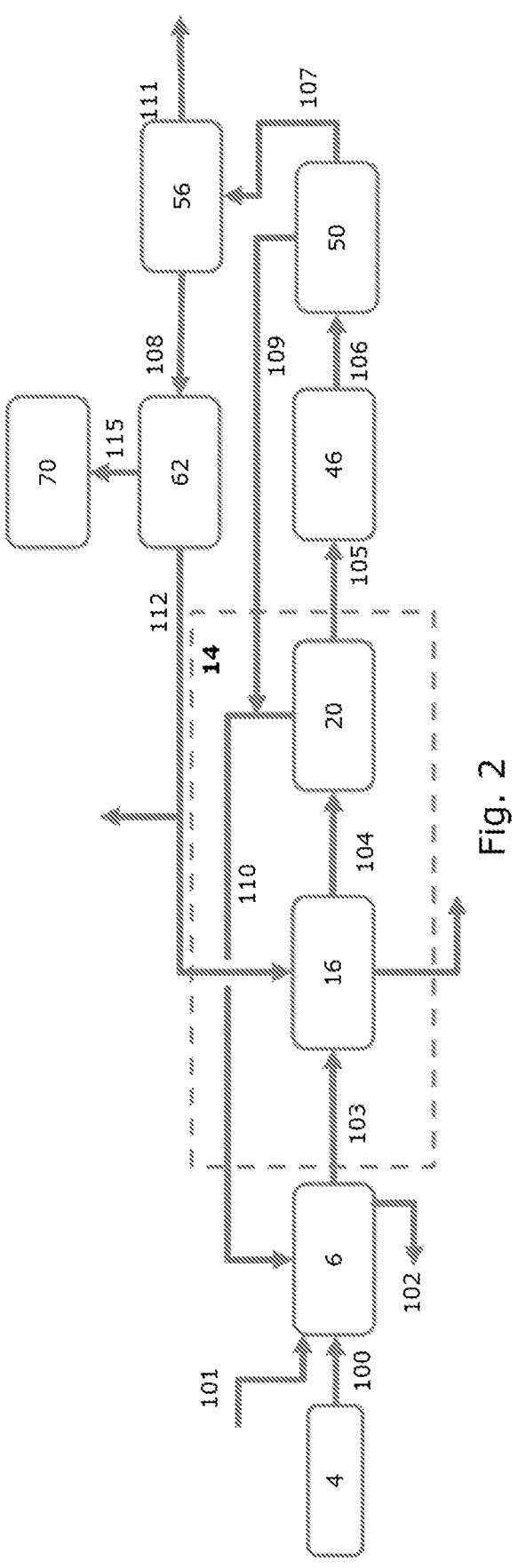
FIG. 2 is a simplified flowsheet depicting an alternative to the embodiment of the invention depicted in FIG. 1 in which impure $CO_2$ gas from the tail gas treatment unit is compressed and then purified first in a selective adsorption unit (or reactor) and then either by distillation or by partial condensation and phase separation.

The Inventors have realized that FIG. 2 of U.S. Pat. No. 10,254,042 depicts an arrangement of integrated first and second stages that would be suitable for use as the purification unit according to these embodiments of the present invention.

These embodiments may further comprise a membrane separation unit for recovering $H_2$ gas from $H_2$-enriched $CO_2$ gas. The membrane separation unit typically comprises an inlet for $H_2$-enriched $CO_2$ gas in fluid flow communication with the second outlet of the first stage of the purification unit, a first outlet for $H_2$-enriched gas in direct fluid flow communication with an inlet of hydrogenation unit (and/or with an inlet of the Claus unit) and a second outlet for waste gas comprising $CO_2$ and at least one non-condensable gas.

These embodiments of the apparatus usually include a vent for the waste gas, optionally with a thermal oxidizer comprising an inlet in fluid flow communication with the second outlet of the membrane separation unit, and an outlet for vent gas in fluid communication with the vent.

In addition, the second outlet of the membrane separation unit may be in fluid flow communication with the second inlet(s) of the hydrogenation unit and/or of the Claus unit, or with a third inlet(s) on the hydrogenation unit and/or on the Claus unit which is typically dedicated for recycle gas.

If the amount of sulfur-containing components in the purified $CO_2$ gas is still above the required threshold, e.g. above 100 ppm, then these embodiments may further comprise a further purification unit selected from a selective adsorption unit and a reactor comprising a bed of solid metal oxide(s) as described above.

A selective adsorption unit in this context typically comprises at least one vessel having an upstream end and a downstream end. The or each vessel comprises an adsorbent bed comprising at least one layer of adsorbent material(s) selective for sulfur-containing compound(s), a first inlet for purified $CO_2$ at the upstream end of the or each vessel, a first outlet for further purified $CO_2$ at the downstream end of the or each vessel, a second inlet for regeneration gas at the downstream end of the or each vessel, and a second outlet for spent regeneration gas at the upstream end of the or each vessel. In these embodiments, the first inlet of the further purification unit is in fluid flow communication with the first outlet of the second stage of the purification unit and the second outlet is in fluid flow communication with the Claus unit. In this regard, the second outlet of the or each vessel may be in fluid flow communication with the second inlet of the Claus unit or with a third inlet on the Claus unit which is typically dedicated for recycle gas.

A reactor in this context typically comprises at least one vessel having an upstream end and a downstream end. The or each vessel comprises at least one solid metal oxide, a first inlet for purified $CO_2$ at the upstream end of the or each vessel, a first outlet for further purified $CO_2$ at the downstream end of the or each vessel, a second inlet for regeneration gas at the downstream end of the or each vessel, and a second outlet for spent regeneration gas at the upstream end of the or each vessel. In addition, the first inlet of the further purification unit is in fluid flow communication with the first outlet of the second stage of the purification unit and the second outlet is in fluid flow communication with the Claus unit. In this regard, the second outlet of the or each vessel may be in fluid flow communication with the second inlet of the Claus unit or with a third inlet on the Claus unit which is typically dedicated for recycle gas.

Turning now to the figures, in FIG. 1, a stream 100 of crude $CO_2$ gas comprising $H_2S$ is taken from an acid gas recovery unit 4 and fed to a Claus unit 6 where $H_2S$ is converted to a stream 102 of elemental sulfur. A sub-stoichiometric amount of oxygen from a stream 101 of air is used to oxidize sufficient $H_2S$ in the crude $CO_2$ gas feed to produce a mixture of $H_2S$ and $SO_2$ in the appropriate proportions to react and produce elemental sulfur. The Claus unit 6 typically converts from 92 mol. % to 99.5 mol. % of the $H_2S$ in the crude $CO_2$ gas feed into elemental sulfur, depending on the type of Claus process. The residual sulfur compounds leave the Claus unit 6 in a stream 103 of Claus tail-gas comprising $CO_2$ which is fed to a tail gas treatment unit 14 comprising a hydrogenation unit 16 and a selective amine absorption unit 20.

The residual sulfur compounds are converted in the hydrogenation unit 16 in the presence of $H_2$ gas produced in a reducing gas generation unit 18, into $H_2S$ to produce a stream 104 of $H_2S$-enriched $CO_2$ tail-gas which, after quenching with water in a direct contact cooler (shown as integrated with the hydrogenation unit—see stream (of water) leaving hydrogenation unit 16), is then fed to the selective amine absorption unit 20 which selectively absorbs $H_2S$ to produce a stream 105 of $H_2S$-depleted $CO_2$ tail-gas and recovered $H_2S$ which is recycled back to the Claus unit 6 as part of stream 110. The $H_2S$-depleted $CO_2$ tail-gas from the tail-gas treatment unit 14 contains mainly $CO_2$, $N_2$, $H_2$ and small quantities of sulfur compounds, and is saturated with water. In the absence of a $CO_2$ capture unit, stream 105 would typically be oxidized in a thermal oxidizer. In this case, however, the $CO_2$ is intended for capture and storage.

The $H_2S$-depleted $CO_2$ tail-gas 105 from tail gas treatment unit 14 is fed to a non-selective amine absorption unit 26 in which most of the $CO_2$ and sulfur compounds are captured and recovered non-selectively to produce a stream 107 of impure $CO_2$ gas, together with a stream 115 of waste gas comprising $CO_2$ and the non-condensable gases, $N_2$ and $H_2$, together with water which is either vented directly or fed to a thermal oxidizer 42 before being vented, depending on its composition.

Stream 107 is mostly $CO_2$ but contains sulfur compounds which may not be acceptable for $CO_2$ sequestration or further use. Stream 107 is therefore fed to compression device 32 where it is compressed to form a stream 108 of compressed impure $CO_2$ gas which is then purified using a selective adsorption unit (or reactor) 36 according to the present invention to remove the sulfur compounds and produce a stream 111 of purified $CO_2$ for sequestration and a stream 109 of spent regeneration gas (or purge gas) comprising desorbed sulfur compound(s) which is recycled to the Claus unit 6.

Water may be removed from the compressed impure $CO_2$ gas in the selective adsorption unit (or reactor) 36 by including at least one layer of water adsorbent material downstream of the layer(s) of sulfur-selective adsorbent material(s) or of the solid metal oxide(s), e.g., ZnO. Alternatively, the stream 111 of purified $CO_2$ may be fed to a drier unit (not shown) prior to sequestration.

The flowsheet depicted in FIG. 2 is an alternative to that depicted in FIG. 1. Unless otherwise indicated, common features between the two flowsheets have been given the same reference numerals. The following is a discussion of the features that distinguish FIG. 2 over FIG. 1.

Instead of air as used in FIG. 1, the process of FIG. 2 uses a stream 101 of $O_2$ or $O_2$-enriched air as the oxidant feed the Claus unit 6 for the conversion of the required amount of $H_2S$ into $SO_2$ for the Claus reaction to produce elemental sulfur.

In addition, stream 105 of $H_2S$-depleted $CO_2$ tail-gas is taken from the tail gas treatment unit 14 and fed directly to a compression device 46 where it is compressed. Water is knocked out of the compressed gas in one or more intercoolers and/or an aftercooler (not shown). A stream 106 of compressed impure $CO_2$ gas is then purified using a selective adsorption unit (or reactor) 50 according to the present invention to remove the sulfur-containing compound(s) and produce a stream 107 of purified $CO_2$ gas and a stream 109 of spent regeneration gas (or purge gas) comprising sulfur-containing compound(s) which is recycled to the Claus unit 6.

Water may be removed from the compressed impure $CO_2$ gas in the selective adsorption unit (or reactor) 50 by including at least one layer of water-adsorbent material downstream of the layer(s) of sulfur-selective adsorbent material(s) or of the solid metal oxide(s), e.g., ZnO. Alternatively, the stream 111 of purified $CO_2$ may be fed to a drier unit (not shown) prior to sequestration.

Stream 107 of purified $CO_2$ gas is then fed to a further purification unit 56 where $CO_2$ is further purified by distillation and/or by partial condensation and phase separation to produce a stream 111 of further purified $CO_2$ for sequestration or other use, and a stream 108 of a waste gas comprising $CO_2$ and $H_2$.

Stream 108 can be recycled directly to the hydrogenation unit 16. However, it may be desirable to reduce the amount of $CO_2$ that is recycled to the hydrogenation unit 16. In such cases, stream 108 may be fed to a membrane unit 62 for $H_2$ recovery to produce a stream 112 of $H_2$-enriched gas and a stream 115 of waste gas.

Stream 112 is recycled to the hydrogenation unit 16. Recycling of this stream in this way has the benefit of reducing or even eliminating the need for fresh $H_2$ from a reducing gas generation unit (not shown) to feed the hydrogenation unit 16.

The stream 115 of waste gas may be vented directly or fed to a thermal oxidizer 70 before being vented, depending on its composition.

Figure 3:
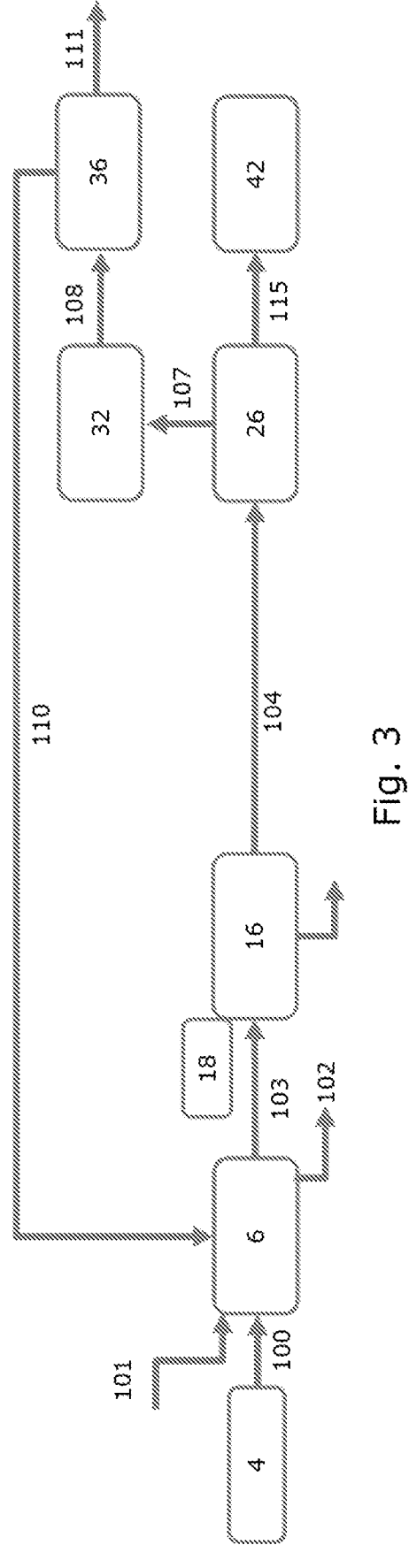
FIG. 3 is a simplified flowsheet depicting a modified version of the process depicted in FIG. 1 without the selective amine absorption step.

The flowsheet depicted in FIG. 3 is a modified version of that depicted in FIG. 1 without the selective amine adsorption unit 20. Unless otherwise indicated, common features between the two flowsheets have been given the same reference numerals. The following is a discussion of the features that distinguish FIG. 3 over FIG. 1.

Stream 104 of $H_2S$-enriched $CO_2$ tail-gas is fed directly from the hydrogenation unit 16 to the non-selective amine absorption unit 26 in which most of the $CO_2$ and sulfur-containing compounds are captured and recovered non-selectively to produce stream 107 of impure $CO_2$ gas, together with a stream 115 of waste gas which is either vented directly or fed to a thermal oxidizer 42 before being vented, depending on its composition.

Figure 4:
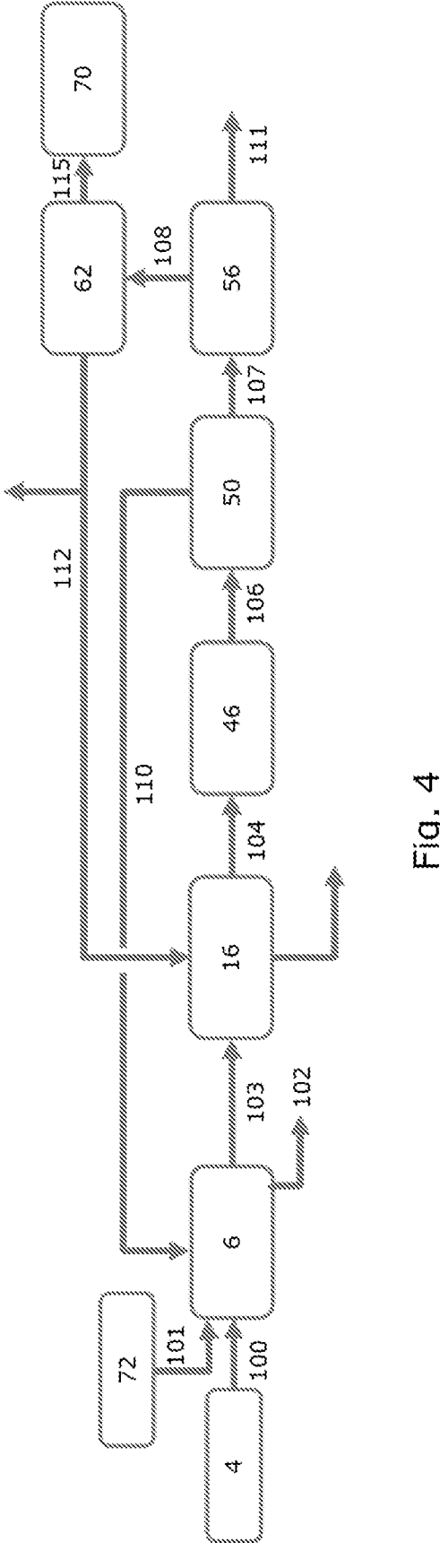
FIG. 4 is a simplified flowsheet depicting a modified version of the process depicted in FIG. 2 without the selective amine absorption step.

The flowsheet depicted in FIG. 4 is a modified version of that depicted in FIG. 2 without the selective amine adsorption unit 20. Unless otherwise indicated, common features between the two flowsheets have been given the same reference numerals. The following is a discussion of the features that distinguish FIG. 4 over FIG. 2.

In this arrangement, the stream 101 of $O_2$ or $O_2$-rich air for the Claus unit 6 is generated in an air separation unit 72 either by vacuum swing adsorption (VSA) or cryogenic air separation (in an air separation unit or ASU).

Stream 104 of impure $CO_2$ tail-gas is fed directly from the hydrogenation unit 16 to the compression device 46 where it is compressed to form stream 106 of compressed impure $CO_2$ gas which is then fed to the selective adsorption unit (or reactor) 50 where $H_2S$ (optionally, together with water) is removed from the gas.

In this arrangement, sufficient $H_2$ may be recovered in the membrane separation unit 62 and recycled to the hydrogenator 16 that a reducing gas generator (not shown) is not required to provide additional $H_2$.

Figure 5:
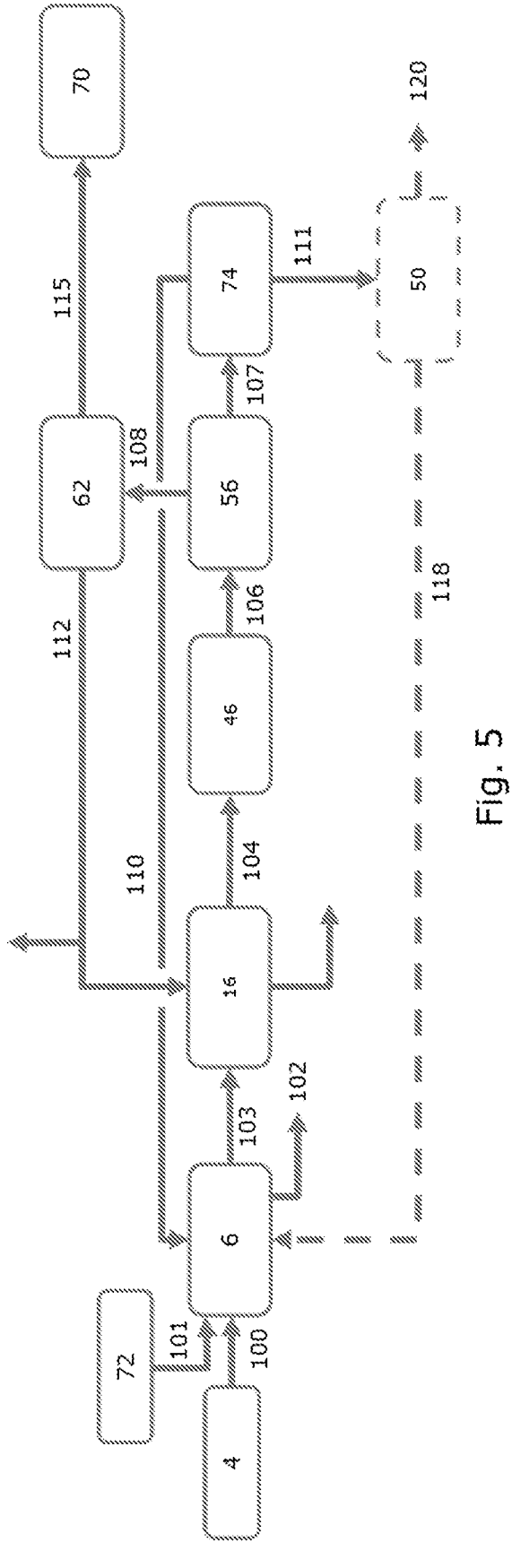
FIG. 5 is a simplified flowsheet of an alternative embodiment of the invention in which the purification unit has a first stage comprising a CPU and a second stage comprising a distillation unit.

The flowsheet depicted in FIG. 5 is a modified version of that depicted in FIG. 4 in which the purification unit comprises a selective adsorption unit (or reactor) to further purify the $CO_2$. Unless otherwise indicated, common features between the two flowsheets have been given the same reference numerals. The following is a discussion of the features that distinguish FIG. 5 over FIG. 4.

The purification unit has a first stage and a second stage. Regarding the first stage, stream 106 of compressed impure $CO_2$ gas is fed to a first stage 56 where $CO_2$ is purified, e.g., by partial condensation with phase separation, to produce $H_2S$-enriched $CO_2$ liquid, and a stream 108 of a waste gas comprising $CO_2$ and $H_2$ for recycling to the hydrogenation unit 16, optionally after passage through a membrane separation unit 62 to recover $H_2$.

A stream 107 of $H_2S$-enriched $CO_2$ liquid (or gas if vaporised) is fed to a distillation column system 74 where $CO_2$ and $H_2S$ are separated in the second stage to generate purified $CO_2$ as overhead gas and $H_2S$-enriched bottoms liquid which is vaporised prior to recycling to the Claus unit 6 in stream 110.

The stream 111 of purified $CO_2$ may be suitable for sequestration. However, if the total amount of sulfur-containing compounds in the purified $CO_2$ is too high, e.g., over 100 ppm, then the purified $CO_2$ may be further purified in a selective adsorption unit (or reactor) 50 to produce a stream 120 of further purified $CO_2$ for sequestration or further use, and a stream 118 of spent regeneration gas (or purge gas) comprising desorbed sulfur-containing compounds which is recycled to the Claus unit 6.

The flowsheets depicted in FIGS. 2, 4 and 5 all involve a membrane separation unit 62 for recovering $H_2$ from waste gas generated in a purification unit. In these embodiments, a purge stream may be taken from the recycle stream 112 to control the build-up of $H_2$ (if it is in excess), or $N_2$ and/or Ar in the processes.

Figure 6:
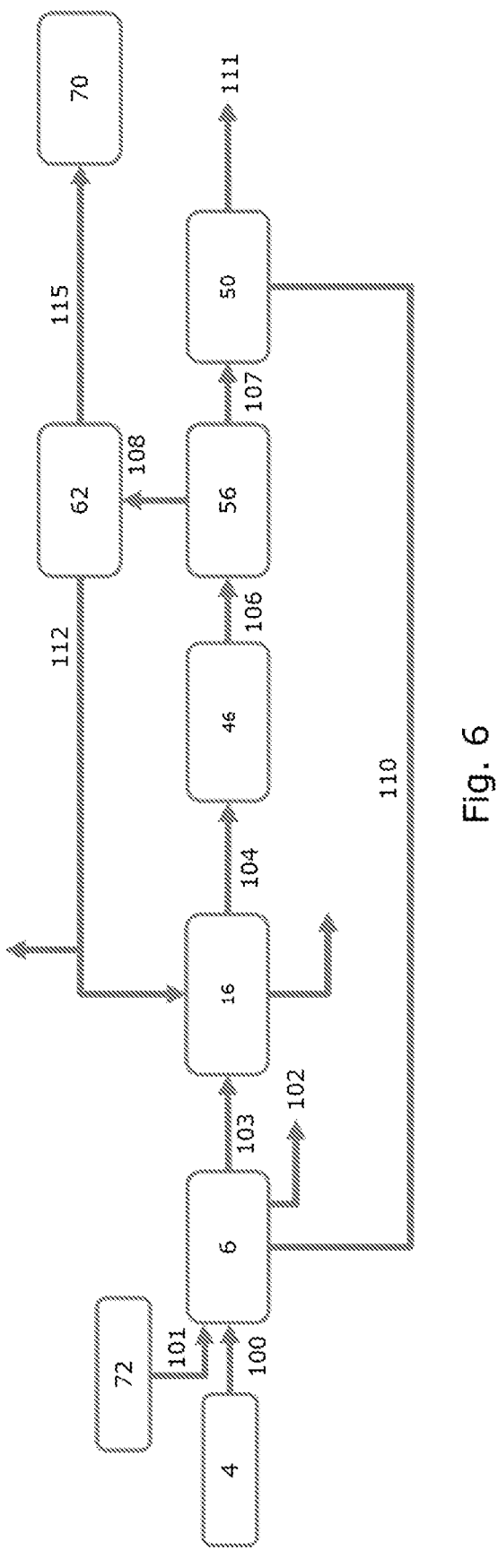
FIG. 6 is a simplified flowsheet depicting a modified version of the process depicted in FIG. 5 with sulfur removal (unit 50) on stream 107 from CPU unit 56.

The flowsheet depicted in FIG. 6 is a modified version of that depicted in FIG. 5 in which the purification unit comprises a single stage and a selective adsorption unit (or reactor) may be used to further purify the $CO_2$. Unless otherwise indicated, common features between the two flowsheets have been given the same reference numerals. The following is a discussion of the features that distinguish FIG. 6 over FIG. 5.

The purification unit has a single stage (unit 56). Stream 106 of compressed impure $CO_2$ gas is fed to unit 56 where $CO_2$ is purified, e.g., by partial condensation with phase separation or distillation, to produce $H_2S$-enriched $CO_2$ liquid, and a stream 108 of a waste gas comprising $CO_2$ and $H_2$ for recycling to the hydrogenation unit 16, optionally after passage through a membrane separation unit 62 to recover $H_2$.

The level of sulfur-containing compounds in stream 107 of $H_2S$-enriched $CO_2$ gas, typically over 2 mol. %, is far too high for CCS. However, rather than purifying the $CO_2$ by distillation (as in FIG. 5), the stream may be fed from unit 56 to the selective adsorption unit (or reactor) 50 to produce a stream 111 of purified $CO_2$ for sequestration or further use, and a stream 110 of spent regeneration gas (or purge gas) comprising desorbed sulfur-containing compounds which is recycled to the Claus unit 6.

Figure 7:
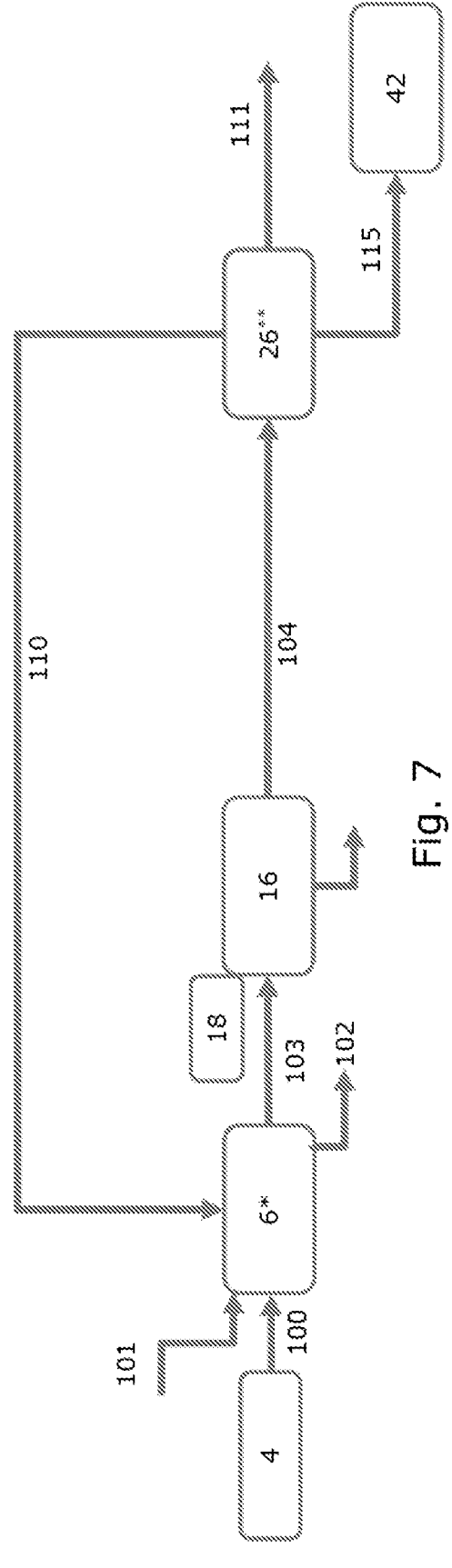
FIG. 7 is a simplified flowsheet depicting embodiments in which the tail gas treatment processes of FIGS. 1 to 5 may be integrated with a SUPERCLAUS® process and/or a EUROCLAUS® process.

The flowsheet in FIG. 7 depicts how a SUPERCLAUS process and/or a EUROCLAUS process (unit 6\*) may be integrated with the tail gas treatment processes depicted in FIGS. 1 to 5. In this regard, unit **26\*\* represents the "CCS block", which includes the specific combination of selective amine absorption unit, non-selective amine absorption unit, compression unit, selective adsorption unit, reactor unit, membrane separation unit and/or purification unit depicted in one of FIGS. 1 to 5. The $H_2S$-containing recycle stream(s) is fed to the Claus unit 6\*, the purified $CO_2$ is removed as stream 111 and the waste gas is sent via stream 115 to the thermal oxidizer unit 42**.

Aspects of the Invention

1. A method for desulfurization of crude $CO_2$ gas comprising $H_2S$ and optionally at least one other sulfur-containing impurity, said method comprising:

feeding crude $CO_2$ gas comprising $H_2S$ to a Claus process to convert $H_2S$ in the presence of $O_2$ gas to elemental sulfur and produce Claus tail-gas comprising $CO_2$, residual $H_2S$ and at least one other sulfur-containing impurity;

feeding said Claus tail-gas to a hydrogenation process to convert said at least one other sulfur-containing impurity into $H_2S$ in the presence of $H_2$ and produce $H_2S$-enriched $CO_2$ tail-gas;

cooling said $H_2S$-enriched $CO_2$ tail gas and removing condensed water to produce cooled $H_2S$-enriched $CO_2$ tail gas;

compressing said cooled $H_2S$-enriched $CO_2$ tail-gas, or an impure $CO_2$ gas comprising $H_2S$ derived therefrom, to produce compressed impure $CO_2$ gas comprising $H_2S$;

removing $H_2S$ and any other sulfur-containing impurities from said compressed impure $CO_2$ gas by physical separation or by chemical reaction with at least one solid metal oxide to form at least one solid metal sulfide and subsequent oxidative regeneration, to produce purified $CO_2$ and a first recycle gas comprising at least one sulfur-containing compound; and recycling said first recycle gas to said Claus process to convert said at least one sulfur-containing compound into elemental sulfur.

2. A method according to #1 comprising:

generating $H_2$ in a hydrogen generation process; and feeding said $H_2$ to said hydrogenation process.

3. A method according to #1 or #2 wherein said $H_2S$-enriched $CO_2$ tail gas is cooled by direct contact with water.

4. A method according to any of #1 to #3 wherein $H_2S$ and any other sulfur-containing impurities are removed from said compressed impure $CO_2$ gas by selective adsorption as said physical separation.

5. A method according to #4 wherein said selective adsorption involves removing $H_2S$ and any other sulfur-containing compounds in the compressed impure $CO_2$ gas by adsorption on a bed comprising at least one adsorbent material selective for sulfur-containing compound(s) in a selective adsorption unit to produce said purified $CO_2$ and, after desorption with a regeneration gas, a spent regeneration gas comprising said $H_2S$ and any other sulfur-containing compounds from the compressed impure $CO_2$ gas as said first recycle gas.

6. A method according to #5, wherein said regeneration gas comprises water in an amount that is insufficient to hydrolyze the other sulfur-containing compounds.

7. A method according to #5 or #6, wherein said compressed impure $CO_2$ gas feed to the selective adsorption unit comprises water, said method comprising drying the purified $CO_2$ gas downstream of said adsorbent material(s) selective for sulfur-containing compound(s).

8. A method according to #1 to #3 wherein $H_2S$ and any other sulfur-containing impurities are removed from said compressed impure $CO_2$ gas by said chemical reaction with at least one solid metal oxide to form solid metal sulfide(s) and subsequent oxidative regeneration.

9. A method according to #8 comprising:

passing said compressed impure $CO_2$ gas through a bed comprising said at least one solid metal oxide in a reactor to convert the metal oxide(s) to metal sulfide(s) and produce said purified $CO_2$; and regenerating the bed using a regeneration gas comprising $O_2$ to produce a spent regeneration gas comprising $SO_2$ as said first recycle gas.

10. A method according to #9 wherein said regeneration gas comprises water in an amount that is insufficient to hydrolyze the other sulfur-containing compounds.

11. A method according to #9 or #10, wherein said compressed impure $CO_2$ gas feed to said reactor comprises water, said method comprising drying the purified $CO_2$ gas downstream of the bed comprising said solid metal oxide(s).

12. A method according to any of #1 to #11 comprising:
recovering $H_2S$ from said $H_2S$-enriched $CO_2$ tail-gas by selective amine absorption to produce $H_2S$-depleted $CO_2$ tail-gas and recovered $H_2S$; and
recycling said recovered $H_2S$ to said Claus process to convert said recovered $H_2S$ to elemental sulfur.

13. A method according to #12 comprising recovering $CO_2$ and residual $H_2S$ from said $H_2S$-depleted $CO_2$ tail-gas by non-selective amine absorption to produce said impure $CO_2$ gas for compression, together with waste gas comprising $CO_2$ and at least one non-condensable gas.

14. A method according to #12, wherein said $H_2S$-depleted $CO_2$ tail-gas is compressed directly to produce said compressed impure $CO_2$ gas.

15. A method according to #14 comprising:
feeding said purified $CO_2$ to a further purification process to produce further purified $CO_2$ and a second recycle gas comprising $CO_2$ and $H_2$; and
recycling said second recycle gas, or a $H_2$-enriched gas derived therefrom, to said hydrogenation process,
wherein a portion of said second recycle gas, or of said $H_2$-enriched gas derived therefrom, is purged.

16. A method according to #15 wherein the amount of $H_2$ recycled to said hydrogenation process is sufficient to meet demand in that process.

17. A method according to #15 or #16 comprising recovering $H_2$ gas from said second recycle gas in a membrane separation process to produce said $H_2$-enriched gas, together with a waste gas comprising $CO_2$ and at least one non-condensable gas.

18. A method according to any of #1 to #3 wherein said $H_2S$-enriched $CO_2$ tail-gas is compressed directly to produce said compressed impure $CO_2$ gas comprising $H_2S$.

19. A method according to any of #1 to #18 comprising:
feeding said purified $CO_2$ to a further purification process to produce further purified $CO_2$ and a second recycle gas comprising $CO_2$ and $H_2$; and
recycling said second recycle gas, or a $H_2$-enriched gas derived therefrom, to said hydrogenation process,
wherein a portion of said second recycle gas, or of said $H_2$-enriched gas derived therefrom, is purged.

20. A method according to #19 wherein the amount of $H_2$ recycled to said hydrogenation process is sufficient to meet demand in that process.

21. A method according to #19 or #20 comprising recovering $H_2$ gas from said second recycle gas in a membrane separation process to produce said $H_2$-enriched gas for recycle, together with a waste gas comprising $CO_2$ and at least one non-condensable gas.

22. A method according to any of #1 to #3 comprising recovering $CO_2$ and $H_2S$ from said $H_2S$-enriched $CO_2$ tail-gas by non-selective amine absorption to produce said impure $CO_2$ gas for compression, together with a waste gas comprising $CO_2$ and at least one non-condensable gas.

24. A method according to #1 to #3, wherein said $H_2S$ and any other sulfur-containing impurities are removed from said compressed impure $CO_2$ gas by distillation and/or partial condensation with phase separation as said physical separation.

25. A method according to #24, wherein said purified $CO_2$ comprises at least one residual sulfur-containing impurity, said method comprising:
further purifying said purified $CO_2$ by selective adsorption or by chemical reaction with at least one solid metal oxide to form solid metal sulfide(s) and subsequent oxidative regeneration, to produce further purified $CO_2$ and a further recycle gas comprising at least one sulfur-containing compound; and
recycling said further recycle gas to said Claus process to convert said sulfur-containing compound(s) into elemental sulfur.

26. A method according to #25, comprising:
removing $H_2$ and any other non-condensable gases from said compressed impure $CO_2$ gas by distillation and/or partial condensation with phase separation to produce HS-enriched $CO_2$ fluid and $H_2$-enriched $CO_2$ gas;
recycling said $H_2$-enriched $CO_2$ gas, or a further $H_2$-enriched $CO_2$ gas derived therefrom, as a second recycle gas to said hydrogenation process; and
separating said $H_2S$-enriched $CO_2$ fluid by distillation and/or partial condensation with phase separation to produce said purified $CO_2$ as overhead gas and a $H_2S$-enriched bottoms liquid;
vaporizing said $H_2S$-enriched bottoms liquid to produce $H_2S$-enriched gas as said first recycle gas;
wherein a portion of said second recycle gas, or of said $H_2$-enriched gas derived therefrom, is purged.

27. A method according to #26 wherein the amount of $H_2$ recycled to said hydrogenation process is sufficient to meet demand in that process.

28. A method according to #26 or #27 comprising recovering $H_2$ gas from said second recycle gas in a membrane separation process to produce said further $H_2$-enriched $CO_2$ gas for recycle, together with a waste gas comprising $CO_2$ and at least one non-condensable gas.

29. A method according to #26 to #28, wherein said purified $CO_2$ overhead gas comprises one or more residual sulfur-containing compounds, said method comprises:
removing $H_2S$ and any other sulfur-containing impurities from said purified $CO_2$ overhead gas by selective adsorption or by chemical reaction with at least one solid metal oxide to form solid metal sulfide(s) and subsequent oxidative regeneration, to produce further purified $CO_2$ and a third recycle gas comprising at least one sulfur-containing compound; and
recycling said third recycle gas to said Claus process to convert said sulfur-containing compound(s) into elemental sulfur.

30. Apparatus for desulfurizing crude $CO_2$ gas comprising $H_2S$ and optionally at least one other sulfur-containing impurity, said apparatus comprising:
a Claus unit for removing $H_2S$ from crude $CO_2$ gas, said Claus unit comprising:
a first inlet for oxidant gas comprising $O_2$;
a second inlet for said crude $CO_2$ gas;

a first outlet for Claus tail-gas comprising $CO_2$, residual $H_2S$ and at least one other sulfur-containing impurity; and a second outlet for elemental sulfur;

a source of oxidant gas comprising $O_2$ in fluid flow communication with the first inlet of the Claus unit;

a source of crude $CO_2$ gas in fluid flow communication with the second inlet of the Claus unit;

a hydrogenation unit for converting said at least one other sulfur-containing impurity in said Claus tail-gas into $H_2S$, said hydrogenation unit comprising:

a first inlet in fluid flow communication with the first outlet of said Claus unit;

a second inlet for $H_2$; and a first outlet for $H_2S$-enriched $CO_2$ tail-gas;

a source of $H_2$ in fluid flow communication with the second inlet of said hydrogenation unit;

a cooling unit for cooling $H_2S$-enriched $CO_2$ tail gas, said cooling unit comprising:

a first inlet in fluid communication with said first outlet of said hydrogenation unit;

a first outlet for cooled $H_2S$-enriched $CO_2$ tail gas; and a second outlet for condensed water;

a compression unit for compressing cooled $H_2S$-enriched $CO_2$ tail-gas or impure $CO_2$ gas comprising $H_2S$ derived therefrom, said compression device comprising:

an inlet in fluid flow communication with the first outlet of said cooling unit; and an outlet for compressed impure $CO_2$ gas;

and a purification unit for removing $H_2S$ and any other sulfur-containing impurities from compressed impure $CO_2$ gas by physical separation or by chemical reaction with at least one metal oxide to form solid metal sulfide(s) and subsequent oxidative regeneration, said purification unit comprising:

a first inlet in fluid flow communication with the outlet of said compression unit;

a first outlet for purified $CO_2$; and a second outlet for a first recycle gas comprising at least one sulfur-containing compound, wherein the second outlet of said purification unit is in fluid communication with said Claus unit.

31. Apparatus according to #30 wherein said source of $H_2$ is an $H_2$ generation unit comprising an outlet for $H_2$ in fluid communication with said second inlet of said hydrogenation unit.

32. Apparatus according to #30 or #31 wherein said cooling unit is a direct contact cooler further comprising a second inlet for cooling water.

33. Apparatus according to #30 wherein said purification unit comprises a selective adsorption unit comprising:

at least one vessel having an upstream end and a downstream end, the or each vessel comprising:

an adsorbent bed, said adsorbent bed comprising at least one layer of adsorbent material(s) selective for sulfur-containing compounds;

a first inlet for compressed impure $CO_2$ gas at said upstream end of the or each vessel;

a first outlet for purified $CO_2$ at said downstream end of the or each vessel;

a second inlet for regeneration gas at said downstream end of the or each vessel; and a second outlet for spent regeneration gas at said upstream end of the or each vessel, wherein said first inlet of said selective adsorption unit is in fluid flow communication with the outlet of said compression unit and wherein said second outlet is in fluid flow communication with said Claus unit.

34. Apparatus according to #33 wherein said adsorbent bed in the or each vessel comprises at least one layer of adsorbent material(s) selective for water downstream of said at least one layer of adsorbent material(s) selective for sulfur-containing compound(s).

35. Apparatus according to #33 or #34 comprising a drier unit downstream of said selective adsorption unit, said drier unit comprising:

an inlet in fluid flow communication with the first outlet of said selective adsorption unit; and an outlet for dry purified $CO_2$ in fluid flow communication with the inlet of said compression unit.

36. Apparatus according to #30 wherein said purification unit comprises a reactor comprising:

at least one vessel having an upstream end and a downstream end, the or each vessel comprising:

a bed comprising at least one solid metal oxide;

a first inlet for compressed impure $CO_2$ gas at said upstream end of the or each vessel;

a first outlet for purified $CO_2$ at said downstream end of the or each vessel;

a second inlet for regeneration gas at said downstream end of the or each vessel; and a second outlet for spent regeneration gas at said upstream end of the or each vessel, wherein said first inlet of said reactor is in fluid flow communication with the outlet of said compression device and wherein said second outlet is in fluid flow communication with said Claus unit.

37. Apparatus according to #36 wherein the or each vessel comprises at least one layer of adsorbent material(s) selective for water downstream of the bed comprising said solid metal oxide(s).

38. Apparatus according to #36 or #37 comprising a drier unit downstream of said reactor, said drier unit comprising:

an inlet in fluid communication with the first outlet of said reactor; and an outlet for dry purified $CO_2$ in fluid flow communication with said compression unit.

39. Apparatus according to any of #30 to #38 comprising:

a selective amine absorption unit for recovering $H_2S$ from $H_2S$-enriched $CO_2$ tail gas, said selective amine absorption unit comprising:

an inlet in fluid flow communication with the first outlet of said cooling unit; and a first outlet for $H_2S$-depleted $CO_2$ tail-gas in fluid flow communication with the inlet of said compression unit; and a second outlet for recovered $H_2S$ in fluid flow communication with said Claus unit.

40. Apparatus according to #39 comprising:

a non-selective amine absorption unit for recovering $CO_2$ and residual $H_2S$ from $H_2S$-depleted $CO_2$ tail-gas, said non-selective amine absorption unit comprising:

an inlet in fluid flow communication with the first outlet of said selective amine absorption unit;

a first outlet for impure $CO_2$ gas in direct fluid flow communication with the inlet of said compression unit; and a second outlet for waste gas comprising $CO_2$ and at least one non-condensable gas.

41. Apparatus according to #39 wherein the first outlet of said selective amine adsorption unit is in direct fluid flow communication with the inlet of said compression unit.

42. Apparatus according to #41 wherein said purification unit is a selective adsorption unit or a reactor, said apparatus further comprising:

a further purification unit for further purifying purified $CO_2$, said further purification unit comprising:

an inlet for purified $CO_2$ in fluid flow communication with said first outlet of said selective adsorption unit or said reactor;

a first outlet for further purified $CO_2$; and a second outlet for a second recycle gas comprising $CO_2$ and $H_2$ in fluid flow communication with said hydrogenation unit, and a purge line in fluid flow communication with the second outlet of said further purification unit.

43. Apparatus according to #42 comprising:

a membrane separation unit for recovering $H_2$ gas from second recycle gas, said membrane separation unit comprising:

an inlet for second recycle gas in fluid flow communication with the second outlet of said further purification unit;

a first outlet for $H_2$-enriched gas in direct fluid flow communication with said hydrogenation unit; and a second outlet for waste gas comprising $CO_2$ and at least one non-condensable gas.

44. Apparatus according to any of #30 to #32 wherein the first outlet of said hydrogenation unit is in direct fluid flow communication with the inlet of said compression unit.

45. Apparatus according to #44 wherein said purification unit is a selective adsorption unit or a reactor, said apparatus further comprising:

a further purification unit for further purifying purified $CO_2$, said further purification comprising:

an inlet for purified $CO_2$ in fluid flow communication with said first outlet of said selective adsorption unit or said reactor;

a first outlet for further purified $CO_2$; and a second outlet for a second recycle gas comprising $CO_2$ and $H_2$ in fluid flow communication with said hydrogenation unit, and a purge line in fluid flow communication with the second outlet of said further purification unit.

46. Apparatus according to #45 comprising:

a membrane separation unit for recovering $H_2$ gas from second recycle gas, said membrane separation unit comprising:

an inlet for second recycle gas in fluid flow communication with the second outlet of said further purification unit;

a first outlet for $H_2$-enriched permeate gas in direct fluid flow communication with an inlet of said hydrogenation unit; and a second outlet for waste retentate gas comprising $CO_2$ and at least one non-condensable gas.

47. Apparatus according to any of #30 to #32 comprising:

a non-selective amine absorption unit for recovering $CO_2$ and $H_2S$ from $H_2S$-enriched $CO_2$ tail-gas, said non-selective amine absorption unit comprising:

an inlet in direct fluid flow communication with the outlet of said cooling unit;

a first outlet for impure $CO_2$ gas in direct fluid flow communication with the inlet of said compression unit; and a second outlet for waste gas comprising $CO_2$ and at least one non-condensable gas.

48. Apparatus according to any of #30 to #32 wherein said purification unit is a single stage purification unit comprising:

an inlet for compressed impure $CO_2$ in fluid flow communication with the outlet of said compression unit;

a first outlet for $H_2S$-enriched $CO_2$ fluid;

a second outlet for $H_2$-enriched $CO_2$ gas in fluid flow communication with an inlet of said hydrogenation unit;

said apparatus comprising a selective adsorption unit comprising:

at least one vessel having an upstream end and a downstream end, the or each vessel comprising:

an adsorbent bed, said adsorbent bed comprising at least one layer of adsorbent material(s) selective for sulfur-containing compound(s);

a first inlet for $H_2S$-enriched $CO_2$ fluid at said upstream end of the or each vessel;

a first outlet for purified $CO_2$ at said downstream end of the or each vessel;

a second inlet for regeneration gas at said downstream end of the or each vessel; and a second outlet for spent regeneration gas at said upstream end of the or each vessel, wherein said first inlet of said selective adsorption vessel is in fluid flow communication with the first outlet of said single stage purification unit and wherein said second outlet is in fluid flow communication with said Claus unit.

49. Apparatus according to any of #30 to #32 wherein said purification unit is a single stage purification unit comprising:

an inlet for compressed impure $CO_2$ in fluid flow communication with the outlet of said compression unit;

a first outlet for $H_2S$-enriched $CO_2$ fluid;

a second outlet for $H_2$-enriched $CO_2$ gas in fluid flow communication with an inlet of said hydrogenation unit;

said apparatus comprising a reactor comprising:

at least one vessel having an upstream end and a downstream end, the or each vessel comprising:

a bed comprising at least one solid metal oxide;

a first inlet for $H_2S$-enriched $CO_2$ fluid at said upstream end of the or each vessel;

a first outlet for purified $CO_2$ at said downstream end of the or each vessel;

a second inlet for regeneration gas at said downstream end of the or each vessel; and a second outlet for spent regeneration gas at said upstream end of the or each vessel, wherein said first inlet of said reactor is in fluid flow communication with the first outlet of said single stage purification unit and wherein said second outlet is in fluid flow communication with said Claus unit.

50. Apparatus according to any of #30 to #32 wherein said purification unit comprises a purification unit comprising a first stage and a second stage;

said first stage comprising:

an inlet for compressed impure $CO_2$ in fluid flow communication with the outlet of said compression unit;

a first outlet for $H_2S$-enriched $CO_2$ fluid;

a second outlet for $H_2$-enriched $CO_2$ gas in fluid flow communication with an inlet of said hydrogenation unit;

said second stage comprising:

an inlet for $H_2S$-enriched $CO_2$ fluid in fluid flow communication with the first outlet of said first stage;

a first outlet for purified $CO_2$ gas;

a second outlet for $H_2S$-enriched gas in fluid flow communication with said Claus unit and a purge line in fluid flow communication with the second outlet of said first stage of said purification unit.

51. Apparatus according to #50 comprising:

a membrane separation unit for recovering $H_2$ gas from $H_2$-enriched $CO_2$ gas, said membrane separation unit comprising:

an inlet for $H_2$-enriched $CO_2$ gas in fluid flow communication with the second outlet of said first stage of said purification unit;

a first outlet for $H_2$-enriched permeate gas in direct fluid flow communication with an inlet of said hydrogenation unit; and a second outlet for waste retentate gas comprising $CO_2$ and at least one non-condensable gas.

52. Apparatus according to #51 comprising a selective adsorption unit comprising:

at least one vessel having an upstream end and a downstream end, the or each vessel comprising:

an adsorbent bed, said adsorbent bed comprising at least one layer of adsorbent material(s) selective for sulfur-containing compound(s);

a first inlet for purified $CO_2$ at said upstream end of the or each vessel;

30 a first outlet for further purified $CO_2$ at said downstream end of the or each vessel;

a second inlet for regeneration gas at said downstream end of the or each vessel; and a second outlet for spent regeneration gas at said upstream end of the or each vessel, wherein said first inlet of said selective adsorption unit is in fluid flow communication with the first outlet of said second stage of said purification unit and wherein said second outlet is in fluid flow communication with said Claus unit.

53. Apparatus according to #51 comprising a reactor comprising:

at least one vessel having an upstream end and a downstream end, the or each vessel comprising:

a bed comprising at least one solid metal oxide;

a first inlet for purified $CO_2$ at said upstream end of the or each vessel;

a first outlet for further purified $CO_2$ at said downstream end of the or each vessel;

a second inlet for regeneration gas at said downstream end of the or each vessel; and a second outlet for spent regeneration gas at said upstream end of the or each vessel, wherein said first inlet of said reactor is in fluid flow communication with the first outlet of said second stage of said purification unit and wherein said second outlet is in fluid flow communication with said Claus unit.

EXAMPLES

Particular embodiments of the invention will now be illustrated by computer modelling in the following examples.

Example 1

The process depicted in the flow sheet of FIG. 1 in which unit 36 is a reactor comprising a bed of mixed metal oxides of the type disclosed in U.S. Pat. No. 4,797,268, was modelled by computer using Aspen Plus (version 10) and the heat and mass balance data for key streams is provided in Table 1.

TABLE 1

|  | 100 | 101 | 102 | 103 | 104 | 105 |
|---|---|---|---|---|---|---|
| Phase | Vapor | Vapor | Liquid | Vapor | Vapor | Vapor |
| Temperature (° C.) | 45.0 | 28.0 | 135.0 | 130.0 | 50.0 | 50.0 |
| Pressure (barg) | 0.9 | 0.8 | 0.5 | 0.3 | 0.1 | 0.1 |
| Mole Flow (kmol/hr) | 1000.0 | 879.5 | 400.0 | 1786.3 | 1701.1 | 1624.7 |
| Mole Fractions |  |  |  |  |  |  |
| CO2 | 0.5500 | 0.0000 | 0.0000 | 0.3386 | 0.3649 | 0.3515 |
| H2S | 0.4000 | 0.0000 | 0.0000 | 0.0086 | 0.0124 | 0.0001 |
| SO2 | 0.0000 | 0.0000 | 0.0000 | 0.0017 | 0.0000 | 0.0000 |
| H2O | 0.0500 | 0.0000 | 0.0000 | 0.2371 | 0.1118 | 0.1135 |
| Sulfur | 0.0000 | 0.0000 | 1.0000 | 0.0017 | 0.0000 | 0.0000 |
| H2 | 0.0000 | 0.0000 | 0.0000 | 0.0236 | 0.0272 | 0.0285 |
| N2 | 0.0000 | 0.7900 | 0.0000 | 0.3890 | 0.4837 | 0.5064 |
| O2 | 0.0000 | 0.2100 | 0.0000 | 0.0000 | 0.0000 | 0.0000 |
|  | 107 | 108 | 109 | 110 | 111 | 115 |
| Phase | Vapor | Vapor | Vapor | Vapor | Vapor | Vapor |
| Temperature (° C.) | Phase | Phase | Phase | Phase | Phase | Phase |
| Pressure (barg) | 45.0 | 50.0 | 50.0 | 52.1 | 50.0 | 50.0 |
| Mole Flow (kmol/hr) | 1.0 | 30.0 | 30.0 | 1.0 | 35.0 | 0.0 |
| Mole Fractions | 541.8 | 518.2 | 9.6 | 85.9 | 500.7 | 1083.0 |

TABLE 1-continued

| | | | | | | |
|---|---|---|---|---|---|---|
| CO2 | | | | | | |
| H2S | 0.9487 | 0.9916 | 0.5365 | 0.6378 | 1.0000 | 0.0527 |
| SO2 | 0.0002 | 0.0002 | 0.0000 | 0.2442 | 0.0000 | 0.0000 |
| H2O | 0.0000 | 0.0000 | 0.0110 | 0.0012 | 0.0000 | 0.0000 |
| Sulfur | 0.0511 | 0.0082 | 0.4525 | 0.1168 | 0.0000 | 0.1447 |
| H2 | 0.0000 | 0.0000 | 0.0000 | 0.0000 | 0.0000 | 0.0000 |
| N2 | 0.0000 | 0.0000 | 0.0000 | 0.0000 | 0.0000 | 0.0427 |
| O2 | 0.0000 | 0.0000 | 0.0000 | 0.0000 | 0.0000 | 0.7598 |
| | 0.0000 | 0.0000 | 0.0000 | 0.0000 | 0.0000 | 0.0000 |

This example illustrates an overall $CO_2$ recovery of 92.5 mol. % at a purity of 100 mol. %, i.e., complete removal of residual $H_2S$ (and water) from impure $CO_2$.

Example 2

The process depicted in the flow sheet of FIG. 2 in which unit 50 is a reactor having a bed of mixed metal oxides of the type disclosed in U.S. Pat. No. 4,797,268 and unit 56 is a CPU of the type disclosed in U.S. Pat. No. 7,819,951, was modelled by computer using Aspen Plus (version 10) and the heat and mass balance data for key streams is provided in Table 2. In the model, the purge stream had zero flow.

TABLE 2

| | 100 | 101 | 102 | 103 | 104 | 105 | 106 |
|---|---|---|---|---|---|---|---|
| Phase | Vapor | Vapor | Liquid | Vapor | Vapor | Vapor | Vapor |
| Temperature (° C.) | 45.0 | 28.0 | 135.0 | 130.0 | 50.0 | 50.0 | 50.0 |
| Pressure (barg) | 0.9 | 0.8 | 0.5 | 0.3 | 0.1 | 0.1 | 30.0 |
| Mole Flow (kmol/hr) | 1000.0 | 183.3 | 400.0 | 1079.7 | 748.3 | 683.5 | 607.2 |
| Mole Fractions | | | | | | | |
| CO2 | 0.5500 | 0.0000 | 0.0000 | 0.5597 | 0.8140 | 0.8198 | 0.9226 |
| H2S | 0.4000 | 0.0000 | 0.0000 | 0.0085 | 0.0181 | 0.0001 | 0.0001 |
| SO2 | 0.0000 | 0.0000 | 0.0000 | 0.0017 | 0.0000 | 0.0000 | 0.0000 |
| H2O | 0.0500 | 0.0000 | 0.0000 | 0.3894 | 0.1117 | 0.1186 | 0.0081 |
| Sulfur | 0.0000 | 0.0000 | 1.0000 | 0.0024 | 0.0000 | 0.0000 | 0.0000 |
| H2 | 0.0000 | 0.0000 | 0.0000 | 0.0383 | 0.0562 | 0.0615 | 0.0692 |
| N2 | 0.0000 | 0.7900 | 0.0000 | 0.0000 | 0.0000 | 0.0000 | 0.0000 |
| O2 | 0.0000 | 0.2100 | 0.0000 | 0.0000 | 0.0000 | 0.0000 | 0.0000 |

| | 107 | 108 | 109 | 110 | 111 | 112 | 115 |
|---|---|---|---|---|---|---|---|
| Phase | Vapor | Vapor | Vapor | Vapor | Vapor | Vapor | Vapor |
| Temperature (° C.) | 50.0 | 30.0 | 50.0 | 42.9 | 20.0 | 30.0 | 29.6 |
| Pressure (barg) | 30.0 | 30.0 | 30.0 | 1.0 | 14.0 | 25.0 | 29.5 |
| Mole Flow (kmol/hr) | 596.6 | 67.2 | 10.7 | 75.4 | 529.4 | 13.6 | 53.6 |
| Mole Fractions | | | | | | | |
| CO2 | 0.9296 | 0.4124 | 0.0000 | 0.1789 | 0.0000 | 0.0000 | 0.0000 |
| H2S | 0.0000 | 0.0000 | 0.0000 | 0.0000 | 0.0000 | 0.0000 | 0.0000 |
| SO2 | 0.0000 | 0.0000 | 0.0000 | 0.0000 | 0.0000 | 0.0000 | 0.0000 |
| H2O | 0.0000 | 0.0000 | 0.4686 | 0.0000 | 0.0000 | 0.0000 | 0.0000 |
| Sulfur | 0.0000 | 0.0000 | 0.0000 | 0.0000 | 0.0000 | 0.0000 | 0.0000 |
| H2 | 0.0704 | 0.5876 | 0.0000 | 0.0000 | 0.0048 | 0.6421 | 0.5737 |
| N2 | 0.0000 | 0.0000 | 0.0000 | 0.0000 | 0.0000 | 0.0000 | 0.0000 |
| O2 | 0.0000 | 0.0000 | 0.0000 | 0.0000 | 0.0000 | 0.0000 | 0.0000 |

This example illustrates an overall $CO_2$ recovery of 95.8 mol. % at a purity of 99.5 mol. % with the remainder being $H_2$, i.e., complete removal of residual $H_2S$ (and water) from impure $CO_2$.

Example 3

The process depicted in the flow sheet of FIG. 3 in which unit 36 is a reactor having a bed of mixed metal oxide of the type disclosed in U.S. Pat. No. 4,797,268 was modelled by computer using Aspen Plus (version 10) and the heat and mass balance data for key streams is provided in Table 3.

TABLE 3

|  | 100 | 101 | 102 | 103 | 104 | 107 |
|---|---|---|---|---|---|---|
| Phase | Vapor | Vapor | Liquid | Vapor | Vapor | Vapor |
| Temperature (° C.) | 45.0 | 28.0 | 135.0 | 130.0 | 50.0 | 45.0 |
| Pressure (barg) | 0.9 | 0.8 | 0.5 | 0.3 | 0.1 | 1.0 |
| Mole Flow (kmol/hr) | 1000.0 | 734.3 | 400.0 | 1567.7 | 1570.8 | 607.2 |
| Mole Fractions |  |  |  |  |  |  |
| CO2 | 0.5500 | 0.0000 | 0.0000 | 0.3634 | 0.3959 | 0.9218 |
| H2S | 0.4000 | 0.0000 | 0.0000 | 0.0093 | 0.0135 | 0.0349 |
| SO2 | 0.0000 | 0.0000 | 0.0000 | 0.0019 | 0.0000 | 0.0000 |
| H2O | 0.0500 | 0.0000 | 0.0000 | 0.2521 | 0.1118 | 0.0434 |
| Sulfur | 0.0000 | 0.0000 | 1.0000 | 0.0015 | 0.0000 | 0.0000 |
| H2 | 0.0000 | 0.0000 | 0.0000 | 0.0240 | 0.0281 | 0.0000 |
| N2 | 0.0000 | 0.7900 | 0.0000 | 0.3478 | 0.4508 | 0.0000 |
| O2 | 0.0000 | 0.2100 | 0.0000 | 0.0000 | 0.0000 | 0.0000 |

|  | 108 | 110 | 111 | 115 |
|---|---|---|---|---|
| Phase | Vapor | Vapor | Vapor | Vapor |
| Temperature (° C.) | 50.0 | 27.1 | 50.0 | 50.0 |
| Pressure (barg) | 30.0 | 1.0 | 30.0 | 0.0 |
| Mole Flow (kmol/hr) | 585.6 | 103.1 | 503.7 | 963.6 |
| Mole Fractions |  |  |  |  |
| CO2 | 0.9556 | 0.5428 | 1.0000 | 0.0645 |
| H2S | 0.0361 | 0.0000 | 0.0000 | 0.0000 |
| SO2 | 0.0000 | 0.2052 | 0.0000 | 0.0000 |
| H2O | 0.0082 | 0.2520 | 0.0000 | 0.1549 |
| Sulfur | 0.0000 | 0.0000 | 0.0000 | 0.0000 |
| H2 | 0.0000 | 0.0000 | 0.0000 | 0.0458 |
| N2 | 0.0000 | 0.0000 | 0.0000 | 0.7348 |
| O2 | 0.0000 | 0.0000 | 0.0000 | 0.0000 |

This example illustrates an overall $CO_2$ recovery of 91.5 mol. % at 100 mol. % purity, i.e., complete removal of residual $H_2S$ (and water) from impure $CO_2$.

Example 4

The process depicted in the flow sheet of FIG. 4 in which unit 50 is a reactor having a bed of mixed metal oxide of the type disclosed in U.S. Pat. No. 4,797,268 was modelled by computer using Aspen Plus (version 10) and the heat and mass balance data for key streams is provided in Table 4.

TABLE 4

|  | 100 | 101 | 102 | 103 | 104 | 106 |
|---|---|---|---|---|---|---|
| Phase | Vapor | Vapor | Liquid | Vapor | Vapor | Vapor |
| Temperature (° C.) | 45.0 | 28.0 | 135.0 | 130.0 | 50.0 | 50.0 |
| Pressure (barg) | 0.9 | 0.8 | 0.5 | 0.3 | 0.1 | 30.0 |
| Mole Flow (kmol/hr) | 1000.0 | 163.7 | 400.0 | 1085.1 | 754.8 | 675.8 |
| Mole Fractions |  |  |  |  |  |  |
| CO2 | 0.5500 | 0.0000 | 0.0000 | 0.5636 | 0.8168 | 0.9120 |
| H2S | 0.4000 | 0.0000 | 0.0000 | 0.0085 | 0.0180 | 0.0201 |
| SO2 | 0.0000 | 0.0000 | 0.0000 | 0.0017 | 0.0000 | 0.0000 |
| H2O | 0.0500 | 0.0000 | 0.0000 | 0.3870 | 0.1117 | 0.0082 |
| Sulfur | 0.0000 | 0.0000 | 1.0000 | 0.0024 | 0.0000 | 0.0000 |
| H2 | 0.0000 | 0.0000 | 0.0000 | 0.0369 | 0.0535 | 0.0598 |
| N2 | 0.0000 | 0.0000 | 0.0000 | 0.0000 | 0.0000 | 0.0000 |
| O2 | 0.0000 | 1.0000 | 0.0000 | 0.0000 | 0.0000 | 0.0000 |

|  | 107 | 108 | 109 | 110 | 111 | 115 |
|---|---|---|---|---|---|---|
| Phase | Vapor | Vapor | Vapor | Vapor | Vapor | Vapor |
| Temperature (° C.) | 50.0 | 30.0 | 27.8 | 20.0 | 30.0 | 29.6 |
| Pressure (barg) | 30.0 | 30.0 | 1.0 | 14.0 | 25.0 | 29.5 |
| Mole Flow (kmol/hr) | 595.0 | 65.7 | 94.3 | 529.3 | 13.4 | 52.3 |
| Mole Fractions |  |  |  |  |  |  |
| CO2 | 0.9321 | 0.4221 | 0.6535 | 0.9854 | 0.3677 | 0.4360 |
| H2S | 0.0000 | 0.0000 | 0.1440 | 0.0000 | 0.0000 | 0.0000 |
| SO2 | 0.0000 | 0.0000 | 0.2025 | 0.0000 | 0.0000 | 0.0000 |

TABLE 4-continued

| | | | | | | |
|---|---|---|---|---|---|---|
| H2O | 0.0000 | 0.0000 | 0.0000 | 0.0000 | 0.0000 | 0.0000 |
| Sulfur | 0.0000 | 0.0000 | 0.0000 | 0.0000 | 0.0000 | 0.0000 |
| H2 | 0.0679 | 0.5779 | 0.0000 | 0.0046 | 0.6323 | 0.5640 |
| N2 | 0.0000 | 0.0000 | 0.0000 | 0.0000 | 0.0000 | 0.0000 |
| O2 | 0.0000 | 0.0000 | 0.0000 | 0.0000 | 0.0000 | 0.0000 |

This example illustrates an overall $CO_2$ recovery of 95.8 mol. % at a purity of 99.5 mol. % with the remainder being $H_2$, i.e., complete removal of residual $H_2S$ (and water) from impure $CO_2$.

Example 5

The process depicted in the flow sheet of FIG. 5 in which the purification unit 56 & 74 is of the type disclosed in FIG. 2 of U.S. Pat. No. 10,254,042A was modelled by computer using Aspen Plus (version 10) and the heat and mass balance data for key streams is provided in Table 5.

TABLE 5

| | 100 | 101 | 102 | 103 | 104 | 106 |
|---|---|---|---|---|---|---|
| Phase | Vapor | Vapor | Liquid | Vapor | Vapor | Vapor |
| Temperature (° C.) | 45.0 | 28.0 | 135.0 | 130.0 | 50.0 | 50.0 |
| Pressure (barg) | 0.9 | 0.8 | 0.5 | 0.3 | 0.1 | 30.0 |
| Mole Flow (kmol/hr) | 1000.0 | 183.3 | 399.9 | 1045.6 | 717.9 | 637.5 |
| Mole Fractions | | | | | | |
| CO2 | 0.5500 | 0.0000 | 0.0000 | 0.5525 | 0.8114 | 0.9134 |
| H2S | 0.4000 | 0.0000 | 0.0000 | 0.0088 | 0.0189 | 0.0212 |
| SO2 | 0.0000 | 0.0000 | 0.0000 | 0.0018 | 0.0000 | 0.0000 |
| H2O | 0.0500 | 0.0000 | 0.0000 | 0.3950 | 0.1117 | 0.0000 |
| Sulfur | 0.0000 | 0.0000 | 1.0000 | 0.0025 | 0.0000 | 0.0000 |
| H2 | 0.0000 | 0.0000 | 0.0000 | 0.0395 | 0.0580 | 0.6553 |
| N2 | 0.0000 | 0.0000 | 0.0000 | 0.0000 | 0.0000 | 0.0000 |
| O2 | 0.0000 | 1.0000 | 0.0000 | 0.0000 | 0.0000 | 0.0000 |

| | 107 | 108 | 110 | 111 | 112 | 115 |
|---|---|---|---|---|---|---|
| Phase | Vapor | Vapor | Vapor | Vapor | Vapor | Vapor |
| Temperature (° C.) | 20.0 | 30.0 | 30.0 | 20.0 | 30.0 | 29.6 |
| Pressure (barg) | 14.0 | 30.0 | 1.0 | 14.0 | 25.0 | 29.5 |
| Mole Flow (kmol/hr) | 569.3 | 68.3 | 41.2 | 528.1 | 13.4 | 54.9 |
| Mole Fractions | | | | | | |
| CO2 | 0.9718 | 0.4265 | 0.6719 | 0.9952 | 0.3721 | 0.4397 |
| H2S | 0.0238 | 0.0000 | 0.3281 | 0.0001 | 0.0000 | 0.0000 |
| SO2 | 0.0000 | 0.0000 | 0.0000 | 0.0000 | 0.0000 | 0.0000 |
| H2O | 0.0000 | 0.0000 | 0.0000 | 0.0000 | 0.0000 | 0.0000 |
| Sulfur | 0.0000 | 0.0000 | 0.0000 | 0.0000 | 0.0000 | 0.0000 |
| H2 | 0.0044 | 0.5735 | 0.0000 | 0.0047 | 0.6279 | 0.5603 |
| N2 | 0.0000 | 0.0000 | 0.0000 | 0.0000 | 0.0000 | 0.0000 |
| O2 | 0.0000 | 0.0000 | 0.0000 | 0.0000 | 0.0000 | 0.0000 |

This example illustrates an overall $CO_2$ recovery of 95.6 mol. % at a purity of 99.5 mol. %. The product $CO_2$ also contains about 0.5 mol. % $H_2$ and no more than 100 ppm $H_2S$ which meets the required specification of $H_2S$ for sequestration.

Example 6

The process depicted in the flow sheet of FIG. 1 in which unit 36 is a selective adsorption unit of the type disclosed in WO2021130530A was modelled by computer using Aspen Plus (version 10) and the heat and mass balance data for key streams is provided in Table 6.

TABLE 6

|  | 100 | 101 | 102 | 103 | 104 | 105 |
|---|---|---|---|---|---|---|
| Phase | Vapor | Vapor | Liquid | Vapor | Vapor | Vapor |
| Temperature (° C.) | 45.0 | 28.0 | 135.0 | 130.0 | 50.0 | 50.0 |
| Pressure (barg) | 0.9 | 0.8 | 0.5 | 0.3 | 0.1 | 0.1 |
| Mole Flow (kmol/hr) | 1000.0 | 880.3 | 400.0 | 1842.7 | 1763.9 | 1682.9 |
| Mole Fractions |  |  |  |  |  |  |
| CO2 | 0.5500 | 0.0000 | 0.0000 | 0.3582 | 0.3832 | 0.3695 |
| H2S | 0.4000 | 0.0000 | 0.0000 | 0.0084 | 0.0119 | 0.0001 |
| SO2 | 0.0000 | 0.0000 | 0.0000 | 0.0017 | 0.0000 | 0.0000 |
| H2O | 0.0500 | 0.0000 | 0.0000 | 0.2301 | 0.1118 | 0.1136 |
| Sulfur | 0.0000 | 0.0000 | 1.0000 | 0.0014 | 0.0000 | 0.0000 |
| H2 | 0.0000 | 0.0000 | 0.0000 | 0.0229 | 0.0262 | 0.0275 |
| N2 | 0.0000 | 0.7900 | 0.0000 | 0.3774 | 0.4668 | 0.4893 |
| O2 | 0.0000 | 0.2100 | 0.0000 | 0.0000 | 0.0000 | 0.0000 |

|  | 107 | 108 | 109 | 110 | 112 | 115 |
|---|---|---|---|---|---|---|
| Phase | Vapor | Vapor | Vapor | Vapor | Vapor | Vapor |
| Temperature (° C.) | 20.0 | 30.0 | 30.0 | 20.0 | 30.0 | 29.6 |
| Pressure (barg) | 14.0 | 30.0 | 1.0 | 14.0 | 25.0 | 29.5 |
| Mole Flow (kmol/hr) | 588.5 | 564.3 | 60.7 | 141.6 | 503.7 | 1094.4 |
| Mole Fractions |  |  |  |  |  |  |
| CO2 | 0.9511 | 0.9917 | 0.9224 | 0.7769 | 1.0000 | 0.0568 |
| H2S | 0.0002 | 0.0002 | 0.0017 | 0.1488 | 0.0000 | 0.0000 |
| SO2 | 0.0000 | 0.0000 | 0.0000 | 0.0000 | 0.0000 | 0.0000 |
| H2O | 0.0487 | 0.0082 | 0.0759 | 0.0743 | 0.0000 | 0.1485 |
| Sulfur | 0.0000 | 0.0000 | 0.0000 | 0.0000 | 0.0000 | 0.0000 |
| H2 | 0.0000 | 0.0000 | 0.0000 | 0.0000 | 0.0000 | 0.0423 |
| N2 | 0.0000 | 0.0000 | 0.0000 | 0.0000 | 0.0000 | 0.7524 |
| O2 | 0.0000 | 0.0000 | 0.0000 | 0.0000 | 0.0000 | 0.0000 |

This example illustrates an overall $CO_2$ recovery of 91.6 mol. % at a purity of 100 mol. %, i.e., complete removal of residual $H_2S$ (and water) from impure $CO_2$ using a selective adsorbent unit 36 (including the layer of water-adsorbent material).

Example 7

The process depicted in the flow sheet of FIG. 6 in which the purification unit 56 is of the type disclosed as the first stage in FIG. 1B of U.S. Pat. No. 10,254,042 A was modelled by computer using Aspen Plus (version 10) and the heat and mass balance data for key streams is provided in Table 7.

TABLE 7

|  | 100 | 101 | 102 | 103 | 104 | 106 |
|---|---|---|---|---|---|---|
| Phase | Vapor | Vapor | Liquid | Vapor | Vapor | Vapor |
| Temperature (° C.) | 45.0 | 28.0 | 135.0 | 130.0 | 50.0 | 60.0 |
| Pressure (barg) | 0.9 | 0.8 | 0.5 | 0.3 | 0.1 | 29.5 |
| Mole Flow (kmol/hr) | 1000.0 | 163.6 | 400.0 | 1076.3 | 750.3 | 663.3 |
| Mole Fractions |  |  |  |  |  |  |
| CO2 | 0.5500 | 0.0000 | 0.0000 | 0.5651 | 0.8173 | 0.9201 |
| H2S | 0.4000 | 0.0000 | 0.0000 | 0.0085 | 0.0181 | 0.0204 |
| SO2 | 0.0000 | 0.0000 | 0.0000 | 0.0017 | 0.0000 | 0.0000 |
| H2O | 0.0500 | 0.0000 | 0.0000 | 0.3850 | 0.1117 | 0.0000 |
| Sulfur | 0.0000 | 0.0000 | 1.0000 | 0.0024 | 0.0000 | 0.0000 |
| H2 | 0.0000 | 0.0000 | 0.0000 | 0.0372 | 0.0529 | 0.0595 |
| N2 | 0.0000 | 0.0000 | 0.0000 | 0.0000 | 0.0000 | 0.0000 |
| O2 | 0.0000 | 1.0000 | 0.0000 | 0.0000 | 0.0000 | 0.0000 |

|  | 107 | 108 | 110 | 111 | 112 | 115 |
|---|---|---|---|---|---|---|
| Phase | Vapor | Vapor | Vapor | Vapor | Vapor | Vapor |
| Temperature (° C.) | 60.0 | 30.0 | 26.3 | 60.0 | 30.0 | 29.6 |
| Pressure (barg) | 29.5 | 30.0 | 1.0 | 29.5 | 25.0 | 29.5 |
| Mole Flow (kmol/hr) | 598.4 | 67.9 | 85.4 | 526.5 | 12.9 | 55.1 |
| Mole Fractions |  |  |  |  |  |  |
| CO2 | 0.9733 | 0.4512 | 0.6816 | 0.9955 | 0.3973 | 0.4638 |

TABLE 7-continued

| H2S | 0.0227 | 0.0000 | 0.0000 | 0.0000 | 0.0000 | 0.0000 |
|---|---|---|---|---|---|---|
| SO2 | 0.0000 | 0.0000 | 0.0000 | 0.0000 | 0.0000 | 0.0000 |
| H2O | 0.0000 | 0.0000 | 0.0000 | 0.0000 | 0.0000 | 0.0000 |
| Sulfur | 0.0000 | 0.0000 | 0.0000 | 0.0000 | 0.0000 | 0.0000 |
| H2 | 0.0040 | 0.5488 | 0.0000 | 0.0045 | 0.6027 | 0.5362 |
| N2 | 0.0000 | 0.0000 | 0.0000 | 0.0000 | 0.0000 | 0.0000 |
| O2 | 0.0000 | 0.0000 | 0.0000 | 0.0000 | 0.0000 | 0.0000 |

This example illustrates an overall $CO_2$ recovery of 95.3 mol. % at a purity of 99.5 mol. %. The product $CO_2$ also contains less than 0.5 mol. % $H_2$ and no $H_2S$ which meets the required specification of $H_2S$ for sequestration.

Example 8

The process depicted in the flow sheet of FIG. 7 (in which unit 26** represents the specific combination of units 26, 32 and 36 from FIG. 1) was modelled by computer using Aspen Plus (version 10) and the heat and mass balance data for key streams is provided in Table 8.

TABLE 8

| | 100 | 101 | 102 | 103 | 104 | 110 | 111 | 115 |
|---|---|---|---|---|---|---|---|---|
| Phase | Vapor | Vapor | Liquid | Vapor | Vapor | Vapor | Vapor | Vapor |
| Temperature (° C.) | 45.0 | 28.0 | 135.0 | 130.0 | 50.0 | 27.4 | 60.0 | 50.0 |
| Pressure (barg) | 0.9 | 0.8 | 0.5 | 0.3 | 0.1 | 1.0 | 30.0 | 0.0 |
| Mole Flow (kmol/hr) | 1000.0 | 838.0 | 400.0 | 1229.7 | 1652.6 | 68.7 | 503.7 | 1061.1 |
| Mole Fractions | | | | | | | | |
| CO2 | 0.5500 | 0.0000 | 0.0000 | 0.3503 | 0.3763 | 0.8149 | 1.0000 | 0.0586 |
| H2S | 0.4000 | 0.0000 | 0.0000 | 0.0005 | 0.0024 | 0.0001 | 0.0000 | 0.0000 |
| SO2 | 0.0000 | 0.0000 | 0.0000 | 0.0003 | 0.0000 | 0.0587 | 0.0000 | 0.0000 |
| H2O | 0.0500 | 0.0000 | 0.0000 | 0.2415 | 0.1118 | 0.1263 | 0.0000 | 0.1479 |
| Sulfur | 0.0000 | 0.0000 | 1.0000 | 0.0015 | 0.0000 | 0.0000 | 0.0000 | 0.0000 |
| H2 | 0.0000 | 0.0000 | 0.0000 | 0.0231 | 0.0314 | 0.0000 | 0.0000 | 0.0490 |
| N2 | 0.0000 | 0.7900 | 0.0000 | 0.3827 | 0.4780 | 0.0000 | 0.0000 | 0.7445 |
| O2 | 0.0000 | 0.2100 | 0.0000 | 0.0000 | 0.0000 | 0.0000 | 0.0000 | 0.0000 |

This example illustrates an overall $CO_2$ recovery of 91.6 mol. % at a purity of 100 mol. %. Thus, while $CO_2$ recovery is less than in other embodiments, the purity of the $CO_2$ is higher in this embodiment.

It will be appreciated that the invention is not restricted to the details described above with reference to the preferred embodiments but that numerous modifications and variations can be made without departing from the spirit and scope of the invention as defined in the following claims.

In this specification, unless expressly otherwise indicated, the word "or" is used in the sense of an operator that returns a true value when either or both of the stated conditions are met, as opposed to the operator "exclusive or" which requires only that one of the conditions is met. The word "comprising" is used in the sense of "including" rather than to mean "consisting of".

All prior teachings above are hereby incorporated herein by reference. No acknowledgement of any prior published document herein should be taken to be an admission or representation that the teaching thereof was common general knowledge in Australia or elsewhere at the date thereof.

The invention claimed is:

1. A method for desulfurization of crude carbon dioxide ($CO_2$) gas comprising hydrogen sulfide ($H_2S$) and optionally at least one other sulfur-containing impurity comprising:
feeding crude $CO_2$ gas comprising $H_2S$ to a Claus process to convert $H_2S$ in the presence of oxygen ($O_2$) gas to elemental sulfur and produce Claus tail-gas comprising $CO_2$, residual $H_2S$ and at least one other sulfur-containing impurity;

feeding said Claus tail-gas to a hydrogenation process to convert said at least one other sulfur-containing impurity into $H_2S$ in the presence of hydrogen ($H_2$) and produce $H_2S$-enriched $CO_2$ tail-gas;

cooling said $H_2S$-enriched $CO_2$ tail gas and removing condensed water to produce cooled $H_2S$-enriched $CO_2$ tail gas;

compressing said cooled $H_2S$-enriched $CO_2$ tail-gas, or an impure $CO_2$ gas comprising $H_2S$ derived therefrom, to produce compressed impure $CO_2$ gas comprising $H_2S$;

removing $H_2S$ and any other sulfur-containing impurities from said compressed impure $CO_2$ gas by physical separation or by chemical reaction with at least one solid metal oxide to form at least one solid metal sulfide and subsequent oxidative regeneration, to produce purified $CO_2$ and a first recycle gas comprising at least one sulfur-containing compound;

recycling said first recycle gas to said Claus process to convert said at least one sulfur-containing compound into elemental sulfur;

feeding said purified $CO_2$ to a further purification unit to produce further purified $CO_2$ and a second recycle gas comprising $CO_2$ and $H_2$; and recycling said second recycle gas, or a $H_2$-enriched gas derived therefrom, to said hydrogenation process, wherein a portion of said second recycle gas, or of said $H_2$-enriched gas derived therefrom, is purged.

2. The method according to claim 1 further comprising: generating $H_2$ in a hydrogen generation process; and feeding said $H_2$ to said hydrogenation process.

3. The method according to claim 1 further comprising: recovering $CO_2$ and $H_2S$ from said $H_2S$-enriched $CO_2$ tail-gas by non-selective amine absorption to produce said impure $CO_2$ gas for compression, together with a waste gas comprising $CO_2$ and at least one non-condensable gas.

4. The method according to claim 1 wherein said $H_2S$-enriched $CO_2$ tail-gas is compressed directly to produce said compressed impure $CO_2$ gas comprising $H_2S$.

5. The method according to claim 1 comprising recovering $H_2$ gas from said second recycle gas in a membrane separation process to produce said $H_2$-enriched gas for recycle to said hydrogenation process, together with a waste gas comprising $CO_2$ and at least one non-condensable gas.

6. The method according to claim 1 wherein $H_2S$ and any other sulfur-containing impurities are removed from said compressed impure $CO_2$ gas by said chemical reaction with at least one solid metal oxide to form solid metal sulfide(s) and subsequent oxidative regeneration.

7. The method according to claim 1 wherein $H_2S$ and any other sulfur-containing impurities are removed from said compressed impure $CO_2$ gas by passing said impure $CO_2$ gas through a bed comprising said at least one solid metal oxide in a reactor to convert the at least one solid metal oxide to at least one metal sulfide and produce said purified $CO_2$; and
regenerating the bed using a regeneration gas comprising $O_2$ to produce a spent regeneration gas comprising sulfur dioxide ($SO_2$) as said first recycle gas.

8. The method according to claim 7 wherein the regeneration gas comprises water in an amount that is insufficient to hydrolyze other sulfur-containing compounds.

9. The method according to claim 7, further comprising drying the purified $CO_2$ gas downstream of the bed comprising said at least one solid metal oxide; wherein said compressed impure $CO_2$ gas feed to said reactor comprises water.

10. A method for desulfurization of crude carbon dioxide ($CO_2$) gas comprising hydrogen sulfide ($H_2S$) and optionally at least one other sulfur-containing impurity comprising:
feeding crude $CO_2$ gas comprising $H_2S$ to a Claus process to convert $H_2S$ in the presence of oxygen ($O_2$) gas to elemental sulfur and produce Claus tail-gas comprising $CO_2$, residual $H_2S$ and at least one other sulfur-containing impurity;
feeding said Claus tail-gas to a hydrogenation process to convert said at least one other sulfur-containing impurity into $H_2S$ in the presence of hydrogen ($H_2$) and produce $H_2S$-enriched $CO_2$ tail-gas;
cooling said $H_2S$-enriched $CO_2$ tail gas and removing condensed water to produce cooled $H_2S$-enriched $CO_2$ tail gas;
compressing said cooled $H_2S$-enriched $CO_2$ tail-gas, or an impure $CO_2$ gas comprising $H_2S$ derived therefrom, to produce compressed impure $CO_2$ gas comprising $H_2S$;
removing $H_2S$ and any other sulfur-containing impurities from said compressed impure $CO_2$ gas by physical separation or by chemical reaction with at least one solid metal oxide to form at least one solid metal sulfide and subsequent oxidative regeneration, to produce purified $CO_2$ and a first recycle gas comprising at least one sulfur-containing compound; and
recycling said first recycle gas to said Claus process to convert said at least one sulfur-containing compound into elemental sulfur;
recovering $H_2S$ from said $H_2S$-enriched $CO_2$ tail-gas by selective amine absorption to produce $H_2S$-depleted $CO_2$ tail-gas and recovered $H_2S$;
recycling said recovered $H_2S$ to said Claus process to convert said recovered $H_2S$ to elemental sulfur; and
recovering $CO_2$ and residual $H_2S$ from said $H_2S$-depleted $CO_2$ tail-gas by non-selective amine absorption to produce said impure $CO_2$ gas for compression, together with waste gas comprising $CO_2$ and at least one non-condensable gas,
wherein said $H_2S$-depleted $CO_2$ tail-gas is compressed directly to produce said compressed impure $CO_2$ gas.

11. The method according to claim 10 further comprising:
feeding said purified $CO_2$ to a further purification unit to produce further purified $CO_2$ and a second recycle gas comprising $CO_2$ and $H_2$; and
recycling said second recycle gas, or a $H_2$-enriched gas derived therefrom, to said hydrogenation process,
wherein a portion of said second recycle gas, or of said $H_2$-enriched gas derived therefrom, is purged.

12. The method according to claim 11 further comprising recovering $H_2$ gas from said second recycle gas in a membrane separation process to produce said $H_2$-enriched gas, together with a waste gas comprising $CO_2$ and at least one non-condensable gas.

13. A method for desulfurization of crude carbon dioxide ($CO_2$) gas comprising hydrogen sulfide ($H_2S$) and optionally at least one other sulfur-containing impurity comprising:
feeding crude $CO_2$ gas comprising $H_2S$ to a Claus process to convert $H_2S$ in the presence of oxygen ($O_2$) gas to elemental sulfur and produce Claus tail-gas comprising $CO_2$, residual $H_2S$ and at least one other sulfur-containing impurity;
feeding said Claus tail-gas to a hydrogenation process to convert said at least one other sulfur-containing impurity into $H_2S$ in the presence of hydrogen ($H_2$) and produce $H_2S$-enriched $CO_2$ tail-gas;
cooling said $H_2S$-enriched $CO_2$ tail gas and removing condensed water to produce cooled $H_2S$-enriched $CO_2$ tail gas;
compressing said cooled $H_2S$-enriched $CO_2$ tail-gas, or an impure $CO_2$ gas comprising $H_2S$ derived therefrom, to produce compressed impure $CO_2$ gas comprising $H_2S$;
removing $H_2S$ and any other sulfur-containing impurities from said compressed impure $CO_2$ gas by physical separation or by chemical reaction with at least one solid metal oxide to form at least one solid metal sulfide and subsequent oxidative regeneration, to produce purified $CO_2$ and a first recycle gas comprising at least one sulfur-containing compound; and
recycling said first recycle gas to said Claus process to convert said at least one sulfur-containing compound into elemental sulfur;
wherein $H_2S$ and any other sulfur-containing impurities are removed from said compressed impure $CO_2$ gas by selective adsorption as said physical separation,
wherein said selective adsorption involves removing $H_2S$ and any other sulfur-containing compounds in the compressed impure $CO_2$ gas by adsorption on a bed comprising at least one adsorbent material selective for sulfur-containing compound(s) in a selective adsorption unit to produce said purified $CO_2$ and, after desorption with a regeneration gas, a spent regeneration gas comprising said $H_2S$ and any other sulfur-containing compounds from the compressed impure $CO_2$ gas as said first recycle gas.

14. The method according to claim 13, further comprising drying the purified $CO_2$ gas downstream of said adsorbent material(s) selective for sulfur-containing compound(s), wherein said regeneration gas comprises water in an amount that is insufficient to hydrolyze said other sulfur-containing compounds, and wherein said compressed impure $CO_2$ gas feed to the selective adsorption unit comprises water.

* * * * *